(12) United States Patent
Tsai et al.

(10) Patent No.: US 9,013,807 B1
(45) Date of Patent: Apr. 21, 2015

(54) IMAGING LENS ASSEMBLY, IMAGING DEVICE AND MOBILE TERMINAL

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/096,891

(22) Filed: Dec. 4, 2013

(30) Foreign Application Priority Data

Oct. 29, 2013 (TW) .............................. 102139027 A

(51) Int. Cl.
*G02B 9/62* (2006.01)
*G02B 13/18* (2006.01)
*G02B 13/00* (2006.01)
*G02B 3/04* (2006.01)

(52) U.S. Cl.
CPC .............. *G02B 13/0045* (2013.01); *G02B 3/04* (2013.01)

(58) Field of Classification Search
CPC ....... G02B 13/0045; G02B 13/18; G02B 9/62
USPC .................................................. 359/713, 756
See application file for complete search history.

(56) References Cited

U.S. PATENT DOCUMENTS

| 8,432,619 | B2 | 4/2013 | Huang | |
|---|---|---|---|---|
| 8,520,320 | B1 | 8/2013 | Huang | |
| 2012/0229917 | A1 * | 9/2012 | Huang | 359/713 |

FOREIGN PATENT DOCUMENTS

CN            203909381            10/2014

* cited by examiner

*Primary Examiner* — Scott J Sugarman
(74) *Attorney, Agent, or Firm* — Tim TingKang Xia, Esq.; Morris, Manning & Martin, LLP

(57) ABSTRACT

An imaging lens assembly includes, in order from an object side to an image side, a first lens element, a second lens element, a third lens element, a fourth lens element, a fifth lens element, and a sixth lens element. The first lens element with positive refractive power has a convex image-side surface. The second lens element has refractive power. The third lens element has refractive power. The fourth lens element has refractive power. The fifth lens element has negative refractive power. The sixth lens element with negative refractive power has a concave image-side surface in a paraxial region thereof, wherein both of the surfaces thereof are aspheric, and at least one of the surfaces thereof has at least one inflection point. The imaging lens assembly has a total of six lens elements with refractive power.

28 Claims, 25 Drawing Sheets

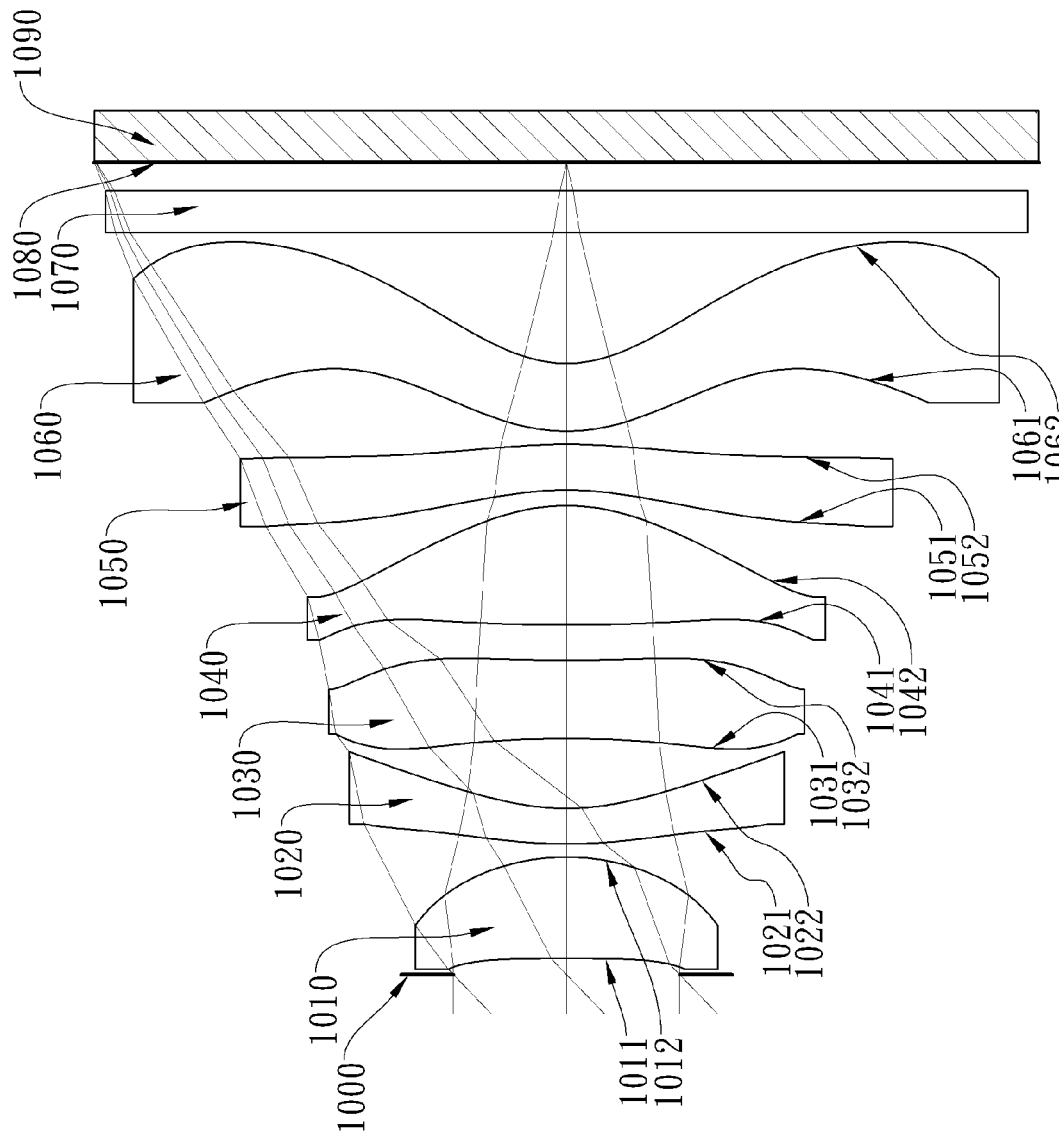

US 9,013,807 B1

IMAGING LENS ASSEMBLY, IMAGING DEVICE AND MOBILE TERMINAL

RELATED APPLICATIONS

This application claims priority to Taiwan Application Serial Number 102139027, filed Oct. 29, 2013, which is incorporated by reference herein in its entirety.

BACKGROUND

1. Technical Field

The present disclosure relates to an imaging lens assembly. More particularly, the present disclosure relates to a compact imaging lens assembly applicable to a mobile terminal.

2. Description of Related Art

In recent years, with the popularity of mobile terminals having camera functionalities, the demand of miniaturized optical systems has been increasing. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system in a portable electronic product typically utilizes a five-element lens structure. Due to the popularity of mobile products with high-end specifications, such as smart phones, tablet personal computers, wearable apparatus and other high-end mobile terminals, the requirements for high resolution and image quality of present compact optical systems increase significantly. However, the conventional optical systems cannot satisfy these requirements of the compact optical systems.

Other conventional compact optical systems with six-element lens structure enhance image quality and resolution compared to the five-element lens structure. However, the arrangement of the refractive powers of the six-element lens structure is not balanced and which might result into field curvature. It is also not favorable for providing the desirable convergence across different wavelength ranges so as to correct the chromatic aberration of the imaging lens assembly. Accordingly, it is not applicable to the mobile terminals with high image quality.

SUMMARY

According to one aspect of the present disclosure, an imaging lens assembly includes, in order from an object side to an image side, a first lens element, a second lens element, a third lens element, a fourth lens element, a fifth lens element, and a sixth lens element. The first lens element with positive refractive power has a convex image-side surface. The second lens element has refractive power. The third lens element has refractive power. The fourth lens element has refractive power. The fifth lens element has negative refractive power. The sixth lens element with negative refractive power has a concave image-side surface in a paraxial region thereof, wherein an object-side surface and the image-side surface of the sixth lens element are aspheric, and at least one of the object-side surface and the image-side surface of the sixth lens element has at least one inflection point. The imaging lens assembly has a total of six lens elements with refractive power. When a focal length of the imaging lens assembly is f, a curvature radius of the image-side surface of the first lens element is R2, and a focal length of the sixth lens element is f6, the following conditions are satisfied:

$-5.0 < f/R2 < -0.5$; and
$-2.0 < f/f6 < -0.90$.

According to another aspect of the present disclosure, an imaging device includes the imaging lens assembly according to the aforementioned aspect and an image sensor, wherein the image sensor is located on an image plane of the imaging lens assembly.

According to still another aspect of the present disclosure, a mobile terminal includes the imaging device according to the aforementioned aspect.

According to yet another aspect of the present disclosure, an imaging lens assembly includes, in order from an object side to an image side, a first lens element, a second lens element, a third lens element, a fourth lens element, a fifth lens element, and a sixth lens element. The first lens element with positive refractive power has a convex image-side surface. The second lens element has refractive power. The third lens element has refractive power. The fourth lens element has refractive power. The fifth lens element with negative refractive power has a concave object-side surface. The sixth lens element with refractive power has a concave image-side surface in a paraxial region thereof, wherein an object-side surface and the image-side surface of the sixth lens element are aspheric, and at least one of the object-side surface and the image-side surface of the sixth lens element has at least one inflection point. The imaging lens assembly has a total of six lens elements with refractive power. When a focal length of the imaging lens assembly is f, a curvature radius of the image-side surface of the first lens element is R2, a focal length of the fourth lens element is f4, and a focal length of the third lens element is f3, the following conditions are satisfied:

$-5.0 < f/R2 < -0.5$; and
$-0.40 < f4/f3 < 0.40$.

According to still yet another aspect of the present disclosure, an imaging lens assembly includes, in order from an object side to an image side, a first lens element, a second lens element, a third lens element, a fourth lens element, a fifth lens element, and a sixth lens element. The first lens element with positive refractive power has a convex image-side surface. The second lens element has refractive power. The third lens element has refractive power. The fourth lens element has refractive power. The fifth lens element with negative refractive power has a concave object-side surface. The sixth lens element with refractive power has a concave image-side surface in a paraxial region thereof, wherein an object-side surface and the image-side surface of the sixth lens element are aspheric, and at least one of the object-side surface and the image-side surface of the sixth lens element has at least one inflection point. The imaging lens assembly has a total of six lens elements with refractive power. When a focal length of the imaging lens assembly is f, a curvature radius of the image-side surface of the first lens element is R2, an Abbe number of the fourth lens element is V4, and an Abbe number of the fifth lens element is V5, the following conditions are satisfied:

$-5.0 < f/R2 < -0.5$; and
$1.5 < V4/V5 < 4.0$.

BRIEF DESCRIPTION OF THE DRAWINGS

The disclosure can be more fully understood by reading the following detailed description of the embodiments, with reference made to the accompanying drawings as follows:

FIG. 10A is a schematic view of an imaging device according to the 10th embodiment of the present disclosure;

DETAILED DESCRIPTION

Figure 1A:
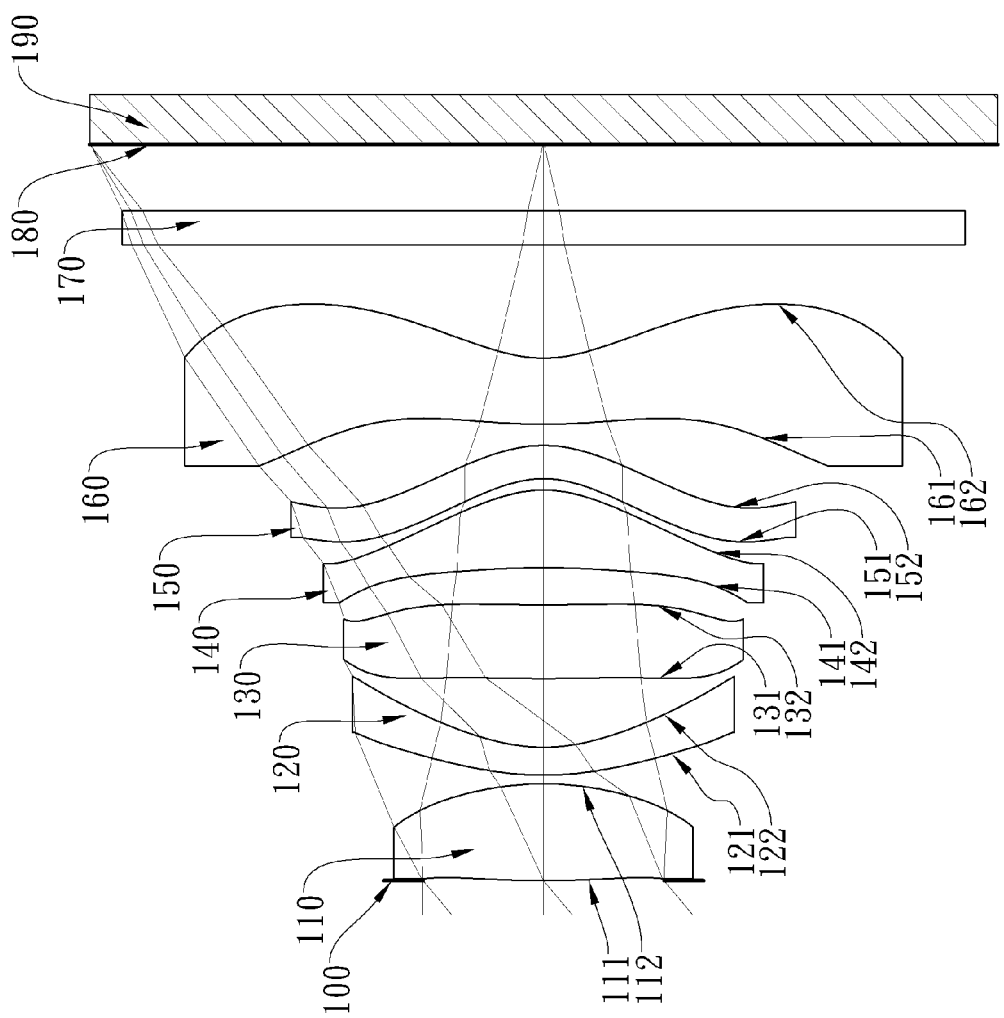
FIG. 1A is a schematic view of an imaging device according to the 1st embodiment of the present disclosure.

An imaging lens assembly includes, in order from an object side to an image side, a first lens element, a second lens element, a third lens element, a fourth lens element, a fifth lens element, and a sixth lens element. The imaging lens assembly has a total of six lens elements with refractive power.

The first lens element has positive refractive power, so that it provides the imaging lens assembly with the positive refractive power as it needs to be so as to reduce the total track length of the imaging lens assembly. The first lens element can have a convex object-side surface and a convex image-side surface, so that it is favorable for reducing spherical aberration. Moreover, the object-side surface of the first lens element can have at least one inflection point, so that it is favorable for correcting the aberration of the off-axis.

The second lens element can have negative refractive power, so that it is favorable for effectively correcting the positive refractive power of the first lens element. The second lens element can have a convex object-side surface and a concave image-side surface, so that it is favorable for effectively correcting the aberration of the imaging lens assembly.

The third lens element can have positive refractive power, so that it is favorable for effectively reducing the photosensitivity of the imaging lens assembly. However, when the third lens element has negative refractive power, the principal point of the imaging lens assembly can be positioned away from the image plane so as to maintain a compact size.

The fourth lens element can have positive refractive power, so that it is favorable for effectively distributing the refractive powers of the imaging lens assembly so as to reduce the photosensitivity of the imaging lens assembly. The fourth lens element can have a convex image-side surface, so that it is favorable for effectively correcting astigmatism and adjusting the refractive power thereof so as to reduce the photosensitivity of the imaging lens assembly.

The fifth lens element has negative refractive power, so that it is favorable for providing the desirable convergence across different wavelength ranges so as to correct the chromatic aberration of the imaging lens assembly. The fifth lens element can have a concave object-side surface and a convex image-side surface, so that it is favorable for correcting astigmatism of the imaging lens assembly.

The sixth lens element can have negative refractive power, so that it is favorable for correcting the aberration of the imaging lens assembly. The sixth lens element can have a convex object-side surface in a paraxial region thereof, so that it is favorable for effectively correcting the distortion and high-order aberration in a peripheral region of the imaging lens assembly so as to improve resolving power. The sixth lens element has a concave image-side surface in a paraxial region thereof, so that it is favorable for the principal point of the imaging lens assembly being positioned away from the image plane so as to reduce the total track length of the imaging lens assembly.

When a focal length of the imaging lens assembly is f, and a curvature radius of the image-side surface of the first lens element is R2, the following condition is satisfied: $-5.0 < f/R2 < -0.5$. Therefore, it is favorable for balancing the positive refractive power of the first lens element so as to reduce the spherical aberration of the imaging lens assembly. Preferably, the following condition is satisfied: $-3.0 < f/R2 < -0.7$.

When the focal length of the imaging lens assembly is f, and a focal length of the sixth lens element is f6, the following condition is satisfied: $-2.0 < f/f6 < -0.90$. Therefore, it is favorable for the sixth lens element having a proper refractive power, effectively reducing the photosensitivity of the imaging lens assembly and correcting the aberration. Preferably, the following condition is satisfied: $-1.8 < f/f6 < -1.0$.

When a focal length of the fourth lens element is f4, and a focal length of the third lens element is f3, the following condition is satisfied: −0.40<f4/f3<0.40. Therefore, it is favorable for effectively balancing the refractive powers of the third lens element and the fourth lens element so as to reduce the photosensitivity of the imaging lens assembly.

When an Abbe number of the fourth lens element is V4, and an Abbe number of the fifth lens element is V5, the following condition is satisfied: 1.5<V4/V5<4.0. Therefore, it is favorable for correcting the chromatic aberration of the imaging lens assembly.

When the focal length of the imaging lens assembly is f, and a curvature radius of the object-side surface of the sixth lens element is R11, the following condition is satisfied: 0.5<f/R11<3.0. Therefore, it is favorable for adjusting high-order aberration.

When a curvature radius of the object-side surface of the fifth lens element is R9, and a curvature radius of the image-side surface of the fifth lens element is R10, the following condition is satisfied: −0.4<(R9−R10)/(R9+R10)<0. Therefore, the curvature radius of the fifth lens element is favorable for correcting astigmatism. Preferably, the following condition is satisfied: −0.3<(R9−R10)/(R9+R10)<0.

When a central thickness of the fifth lens element is CT5, and a central thickness of the third lens element is CT3, the following condition is satisfied: 0.20<CT5/CT3<0.60. Therefore, the thickness of every lens element will be proper for assembling lens elements and maintaining a proper total track length.

When the Abbe number of the fourth lens element is V4, an Abbe number of the sixth lens element is V6, and the Abbe number of the fifth lens element is V5, the following condition is satisfied: 4.0<(V4+V6)/V5<6.5. Therefore, it is favorable for providing the desirable convergence across different wavelength ranges so as to correct the chromatic aberration of the imaging lens assembly.

When a curvature radius of an object-side surface of the third lens element is R5, and a curvature radius of the image-side surface of the third lens element is R6, the following condition is satisfied: −0.65<(R5−R6)/(R5+R6)<0.20. Therefore, it is favorable for further correcting aberration.

When a maximum image height of the imaging lens assembly (half of a diagonal length of an effective photosensitive area of an image sensor) is ImgH, and an f-number of the imaging lens assembly is Fno, the following condition is satisfied: 1.3 mm<ImgH/Fno<4.0 mm. Therefore, it is favorable for providing enough lights so as to produce good image quality.

When half of a maximal field of view of the imaging lens assembly is HFOV, and the following condition is satisfied: 38 degrees<HFOV. Therefore, it is favorable for providing enough field of view.

According to the imaging lens assembly of the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging lens assembly can also be reduced.

According to the imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, an aperture stop can be configured as a front stop or a middle stop. A front stop disposed between an imaged object and the first lens element can provide a longer distance between an exit pupil of the imaging lens assembly and the image plane and thereby improves the image-sensing efficiency of an image sensor. A middle stop disposed between the first lens element and the image plane is favorable for enlarging the field of view of the imaging lens assembly and thereby provides a wider field of view for the same.

The present imaging lens assembly can be optionally applied to moving focus optical systems. According to the imaging lens assembly of the present disclosure, the imaging lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an imaging device is provided. The imaging device includes the imaging lens assembly according to the aforementioned imaging lens assembly of the present disclosure, and an image sensor, wherein the image sensor is disposed on an image plane of the aforementioned imaging lens assembly. Therefore, the design of the imaging lens assembly is favorable for reducing the spherical aberration, avoiding the lens elements close to the object side from having excessively large curvature radius so as to reduce the design difficulty and dust adhesion. Moreover, it is also favorable for providing the desirable convergence across different wavelength ranges so as to correct the chromatic aberration of the imaging lens assembly. Preferably, the imaging device can further include a barrel member, a holding member or a combination thereof.

Figure 12A:
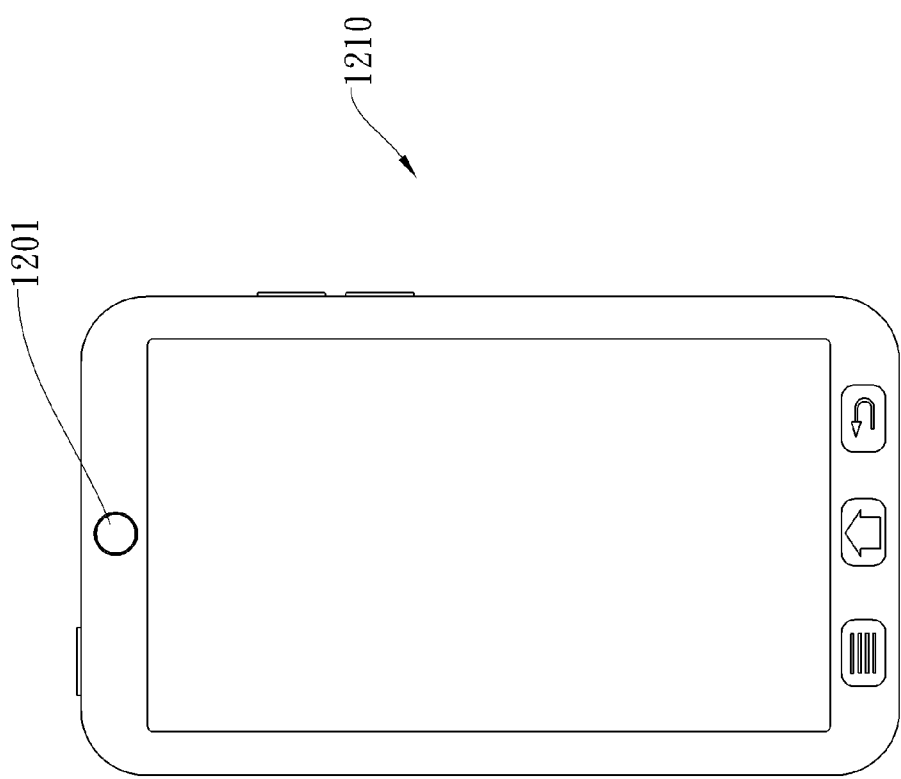
FIG. 12A shows a smart phone with an imaging device of the present disclosure installed therein.
Figure 12B:
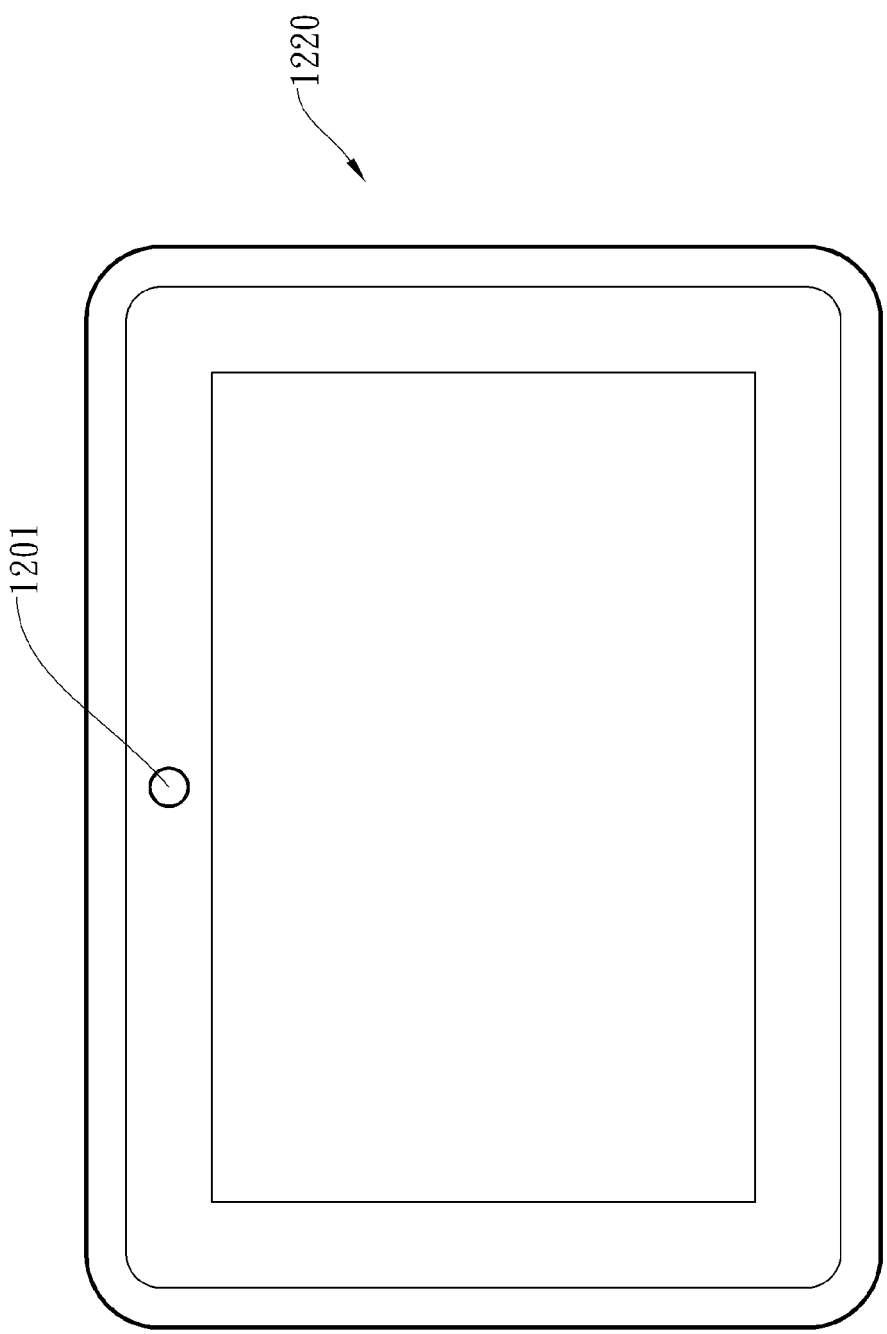
FIG. 12B shows a tablet personal computer with an imaging device of the present disclosure installed therein.
Figure 12C:
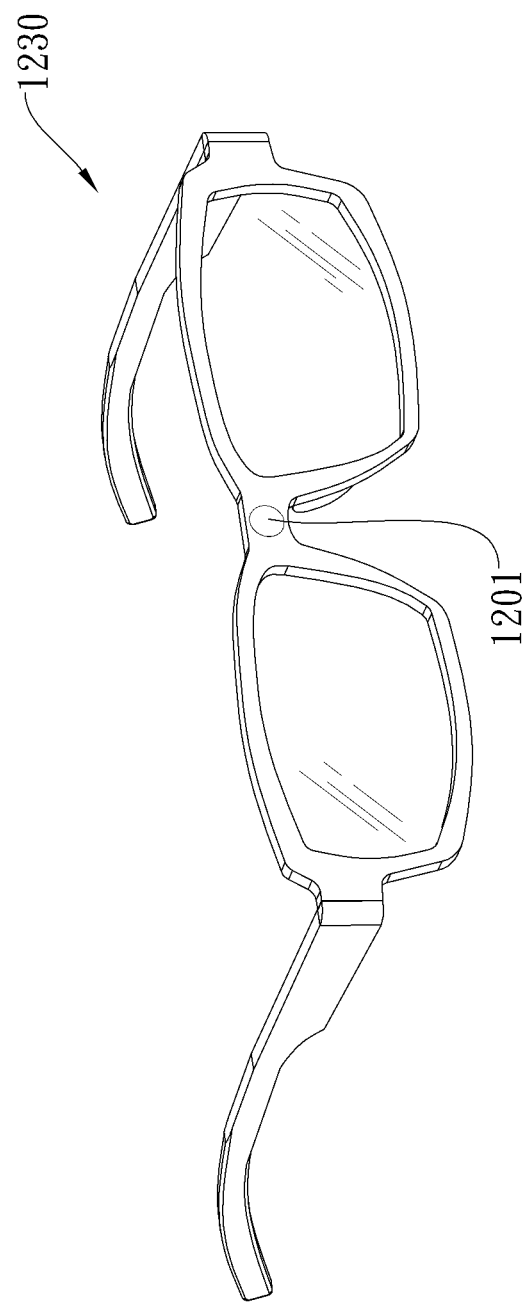
FIG. 12C shows a wearable device with an imaging device of the present disclosure installed therein.

In FIG. 12A, FIG. 12B and FIG. 12C, an imaging device 1201 may be installed in but not limited to a mobile terminal, including a smart phone 1210, a tablet personal computer 1220 or a wearable device 1230. The three exemplary figures of different kinds of mobile terminal are only exemplary for showing the imaging device of present disclosure installing in a mobile terminal and is not limited thereto. Preferably, the mobile terminal can further include but not limited to display, control unit, random access memory unit (RAM) a read only memory unit (ROM) or a combination thereof.

According to the above description of the present disclosure, the following 1st-11th specific embodiments are provided for further explanation.

1st Embodiment

Figure 1B:
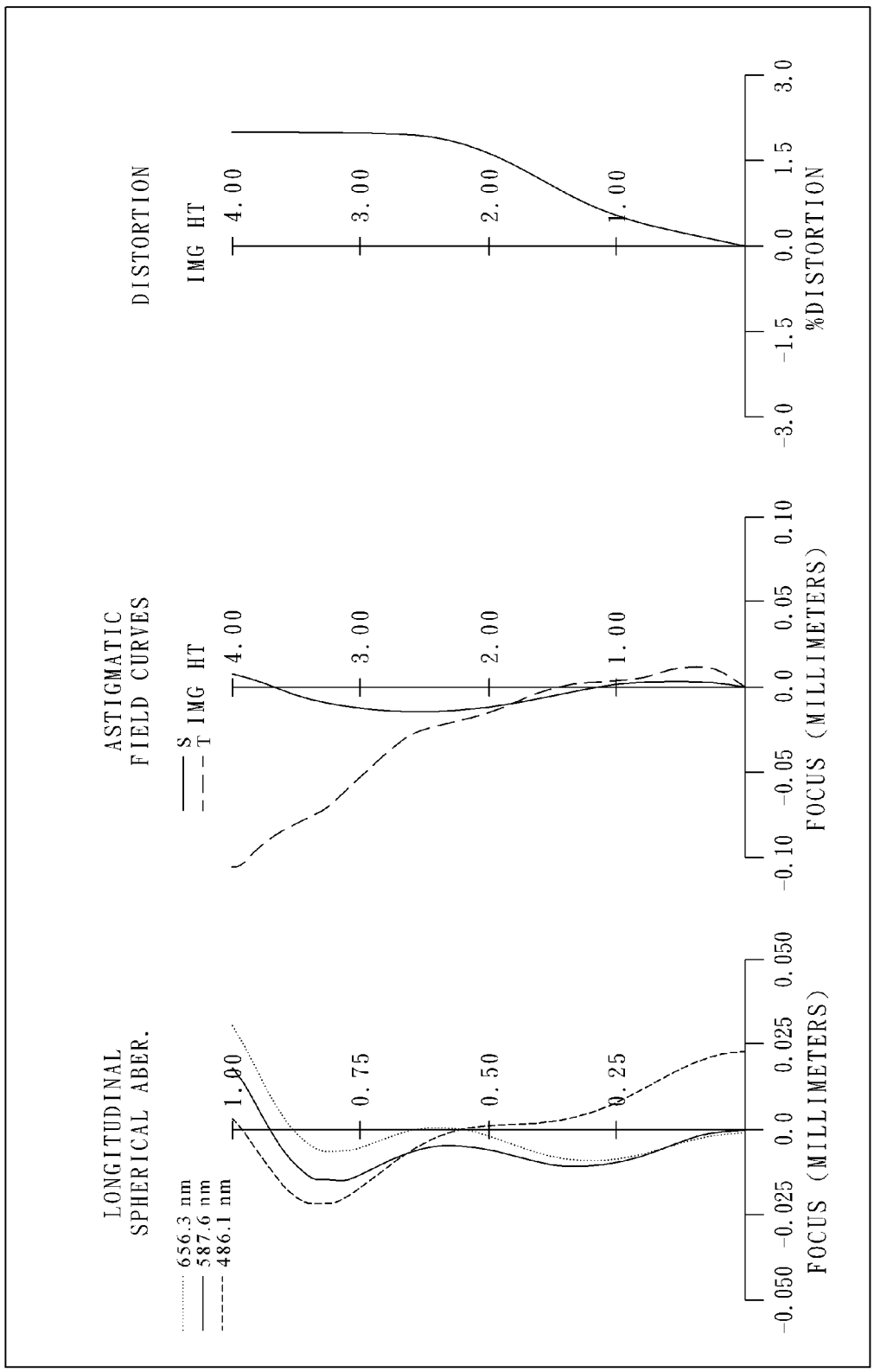
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging device according to the 1st embodiment.

In FIG. 1A, the imaging device includes the imaging lens assembly (not otherwise herein labeled) of the present disclosure and an image sensor 190. The imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image plane 180, wherein the imaging lens assembly has a total of six lens elements (110-160) with refractive power.

The first lens element 110 with positive refractive power has a convex object-side surface 111 and a convex image-side surface 112, which are both aspheric, and the first lens element 110 is made of plastic material.

The second lens element 120 with negative refractive power has a convex object-side surface 121 and a concave image-side surface 122, which are both aspheric, and the second lens element 120 is made of plastic material.

The third lens element 130 with negative refractive power has a convex object-side surface 131 and a concave image-side surface 132, which are both aspheric, and the third lens element 130 is made of plastic material.

The fourth lens element 140 with positive refractive power has a concave object-side surface 141 and a convex image-side surface 142, which are both aspheric, and the fourth lens element 140 is made of plastic material.

The fifth lens element 150 with negative refractive power has a concave object-side surface 151 and a convex image-side surface 152, which are both aspheric, and the fifth lens element 150 is made of plastic material.

The sixth lens element 160 with negative refractive power has a convex object-side surface 161 in a paraxial region thereof and a concave image-side surface 162 in a paraxial region thereof, which are both aspheric, and the sixth lens element 160 is made of plastic material. Moreover, both of the object-side surface 161 and the image-side surface 162 of the sixth lens element 160 have at least one inflection point.

The IR-cut filter 170 is made of glass and located between the sixth lens element 160 and the image plane 180, and will not affect the focal length of the imaging lens assembly. The image sensor 190 is disposed on the image plane 180 of the imaging lens assembly.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma(Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly of the imaging device according to the 1st embodiment, when a focal length of the imaging lens assembly is f, an f-number of the imaging lens assembly is Fno, and half of a maximal field of view of the imaging lens assembly is HFOV, these parameters have the following values: f=4.68 mm; Fno=2.20; and HFOV=40.0 degrees.

In the imaging lens assembly of the imaging device according to the 1st embodiment, when an Abbe number of the fourth lens element 140 is V4, and an Abbe number of the fifth lens element 150 is V5, the following condition is satisfied: V4/V5=2.61.

In the imaging lens assembly of the imaging device according to the 1st embodiment, when the Abbe number of the fourth lens element 140 is V4, an Abbe number of the sixth lens element 160 is V6, and the Abbe number of the fifth lens element 150 is V5, the following condition is satisfied: (V4+V6)/V5=5.21.

In the imaging lens assembly of the imaging device according to the 1st embodiment, when a central thickness of the fifth lens element 150 is CT5, and a central thickness of the third lens element 130 is CT3, the following condition is satisfied: CT5/CT3=0.45.

In the imaging lens assembly of the imaging device according to the 1st embodiment, when a curvature radius of the object-side surface 131 of the third lens element 130 is R5, and a curvature radius of the image-side surface 132 of the third lens element 130 is R6, the following condition is satisfied: (R5−R6)/(R5+R6)=0.02.

In the imaging lens assembly of the imaging device according to the 1st embodiment, when a curvature radius of the object-side surface 151 of the fifth lens element 150 is R9, and a curvature radius of the image-side surface 152 of the fifth lens element 150 is R10, the following condition is satisfied: (R9−R10)/(R9+R10)=−0.09.

In the imaging lens assembly of the imaging device according to the 1st embodiment, when the focal length of the imaging lens assembly is f, and a curvature radius of the object-side surface 161 of the sixth lens element 160 is R11, the following condition is satisfied: f/R11=0.95.

In the imaging lens assembly of the imaging device according to the 1st embodiment, when the focal length of the imaging lens assembly is f, and a curvature radius of the image-side surface 112 of the first lens element 110 is R2, the following condition is satisfied: f/R2=−1.92.

In the imaging lens assembly of the imaging device according to the 1st embodiment, when a focal length of the fourth lens element 140 is f4, and a focal length of the third lens element 130 is f3, the following condition is satisfied: f4/f3=0.00.

In the imaging lens assembly of the imaging device according to the 1st embodiment, when the focal length of the imaging lens assembly is f, and a focal length of the sixth lens element 160 is f6, the following condition is satisfied: f/f6=−1.61.

In the imaging lens assembly of the imaging device according to the 1st embodiment, when a maximum image height of the imaging lens assembly is ImgH, and the f-number of the imaging lens assembly is Fno, the following condition is satisfied: ImgH/Fno=1.82 mm.

The detailed optical data of the 1st embodiment are shown in Table 1 and the aspheric surface data are shown in Table 2 below.

TABLE 1

Embodiment 1
f = 4.68 mm, Fno = 2.20, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.001 | | | | |
| 2 | Lens 1 | 7.635 | ASP | 0.857 | Plastic | 1.544 | 55.9 | 3.50 |
| 3 | | −2.439 | ASP | 0.076 | | | | |
| 4 | Lens 2 | 2.700 | ASP | 0.245 | Plastic | 1.650 | 21.4 | −5.49 |
| 5 | | 1.482 | ASP | 0.607 | | | | |
| 6 | Lens 3 | 17.030 | ASP | 0.650 | Plastic | 1.544 | 55.9 | −1872.92 |
| 7 | | 16.525 | ASP | 0.329 | | | | |
| 8 | Lens 4 | −7.557 | ASP | 0.686 | Plastic | 1.544 | 55.9 | 2.24 |
| 9 | | −1.081 | ASP | 0.100 | | | | |
| 10 | Lens 5 | −0.918 | ASP | 0.295 | Plastic | 1.650 | 21.4 | −22.87 |
| 11 | | −1.102 | ASP | 0.186 | | | | |
| 12 | Lens | 64.924 | ASP | 0.584 | Plastic | 1.535 | 55.7 | −2.91 |
| 13 | | 1.135 | ASP | 1.000 | | | | |
| 14 | IR-cut filter | Plano | | 0.300 | Glass | 1.517 | 64.2 | — |
| 15 | | Plano | | 0.586 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | −3.6325E+01 | −1.4808E+01 | −1.0021E+01 | −6.2372E+00 | −2.0000E+01 | −7.0000E+01 |
| A4 = | −1.8342E−02 | −3.6314E−02 | 8.1095E−03 | 3.0061E−02 | −3.4621E−02 | −3.0184E−02 |
| A6 = | −1.6202E−02 | −2.4812E−02 | −4.7221E−03 | −5.2603E−03 | 3.8213E−03 | −5.3869E−03 |
| A8 = | −4.1178E−03 | 1.4213E−02 | 4.8456E−03 | 3.3603E−04 | 5.8951E−03 | 1.2907E−03 |
| A10 = | 1.2966E−02 | 9.9742E−04 | −4.6686E−03 | −2.2444E−03 | −6.0320E−04 | −6.6071E−04 |
| A12 = | −1.2360E−02 | −4.6634E−03 | 2.1465E−03 | 1.6589E−03 | −8.2280E−05 | 3.5621E−04 |
| A14 = | 3.4917E−03 | 1.2894E−03 | −3.2729E−04 | −2.9578E−04 | | |

| Surface # | 8 | 9 | 10 | 11 | 12 | 13 |
|---|---|---|---|---|---|---|
| k = | −1.4576E+01 | −3.4376E+00 | −3.2897E+00 | −3.9340E+00 | −1.0000E+00 | −4.9060E+00 |
| A4 = | 1.5727E−02 | 1.6206E−02 | 2.6672E−02 | −3.6095E−03 | −5.4074E−02 | −2.8484E−02 |
| A6 = | −5.5677E−03 | −1.9455E−02 | 8.4449E−04 | 1.0866E−02 | 4.4084E−03 | 3.9946E−03 |
| A8 = | −4.1696E−03 | 1.3459E−04 | −4.9767E−05 | −1.8083E−03 | 2.8797E−04 | −3.8951E−04 |
| A10 = | 1.6615E−03 | 5.8660E−05 | 2.0601E−05 | 2.7537E−04 | −4.3708E−05 | 1.4410E−05 |
| A12 = | −2.8293E−04 | 9.8578E−06 | −1.1961E−05 | −4.7845E−05 | −1.6661E−06 | 5.0077E−07 |
| A14 = | 2.5293E−05 | | | 3.0097E−06 | 3.0749E−07 | −5.1652E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
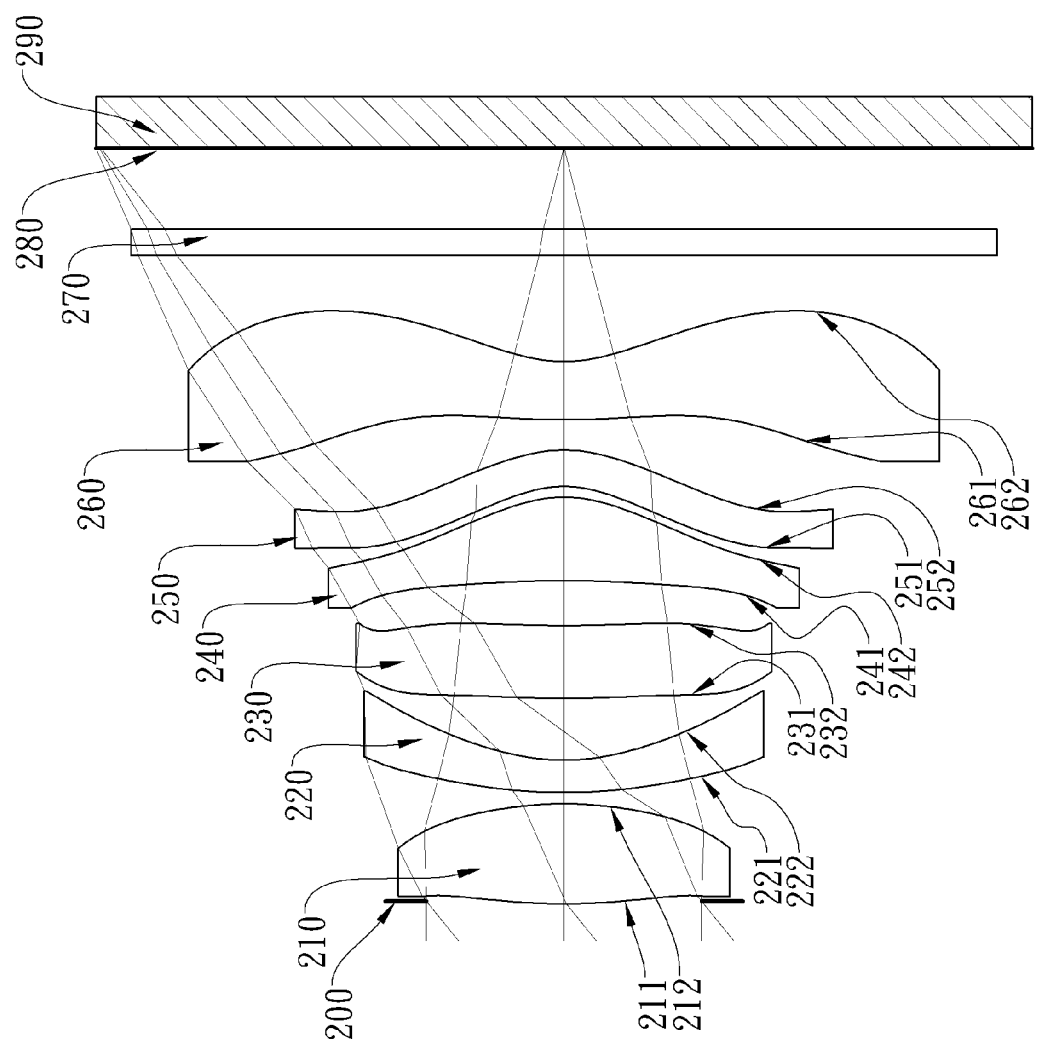
FIG. 2A is a schematic view of an imaging device according to the 2nd embodiment of the present disclosure.
Figure 2B:
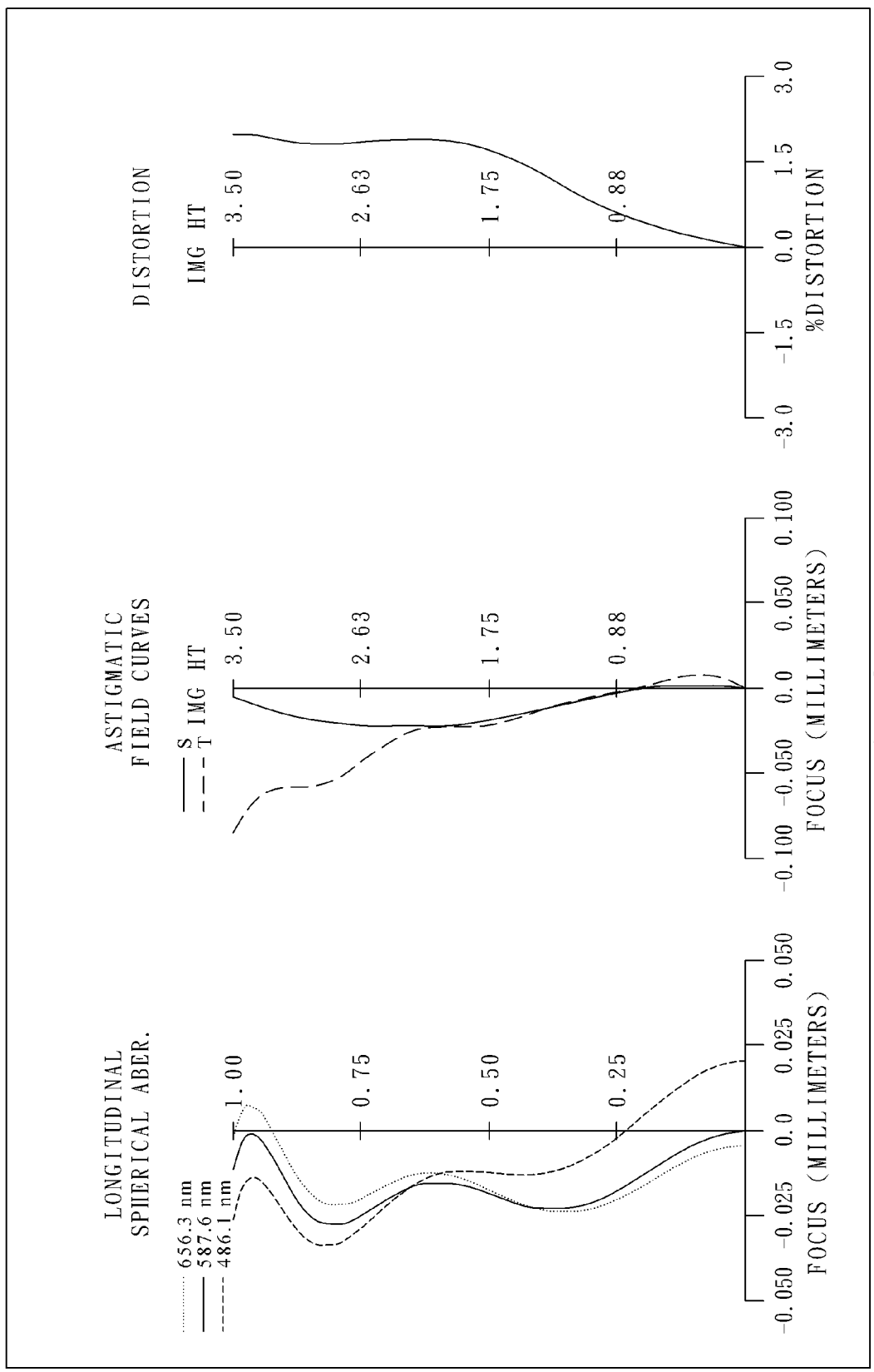
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging device according to the 2nd embodiment.

In FIG. 2A, the imaging device includes the imaging lens assembly (not otherwise herein labeled) of the present disclosure and an image sensor 290. The imaging lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image plane 280, wherein the imaging lens assembly has a total of six lens elements (210-260) with refractive power.

The first lens element 210 with positive refractive power has a convex object-side surface 211 and a convex image-side surface 212, which are both aspheric, and the first lens element 210 is made of plastic material.

The second lens element 220 with negative refractive power has a convex object-side surface 221 and a concave image-side surface 222, which are both aspheric, and the second lens element 220 is made of plastic material.

The third lens element 230 with positive refractive power has a convex object-side surface 231 and a concave image-side surface 232, which are both aspheric, and the third lens element 230 is made of plastic material.

The fourth lens element 240 with positive refractive power has a concave object-side surface 241 and a convex image-side surface 242, which are both aspheric, and the fourth lens element 240 is made of plastic material.

The fifth lens element 250 with negative refractive power has a concave object-side surface 251 and a convex image-side surface 252, which are both aspheric, and the fifth lens element 250 is made of plastic material.

The sixth lens element 260 with negative refractive power has a convex object-side surface 261 in a paraxial region thereof and a concave image-side surface 262 in a paraxial region thereof, which are both aspheric, and the sixth lens element 260 is made of plastic material. Moreover, both of the object-side surface 261 and the image-side surface 262 of the sixth lens element 260 have at least one inflection point.

The IR-cut filter 270 is made of glass and located between the sixth lens element 260 and the image plane 280, and will not affect the focal length of the imaging lens assembly. The image sensor 290 is disposed on the image plane 280 of the imaging lens assembly.

The detailed optical data of the 2nd embodiment are shown in Table 3 and the aspheric surface data are shown in Table 4 below.

TABLE 3

Embodiment 2
f = 4.25 mm, Fno = 2.05, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.021 | | | | |
| 2 | Lens 1 | 4.331 | ASP | 0.755 | Plastic | 1.572 | 56.0 | 3.03 |
| 3 | | −2.709 | ASP | 0.085 | | | | |
| 4 | Lens 2 | 3.946 | ASP | 0.244 | Plastic | 1.640 | 23.3 | −4.27 |
| 5 | | 1.575 | ASP | 0.466 | | | | |
| 6 | Lens 3 | 7.277 | ASP | 0.549 | Plastic | 1.572 | 56.0 | 75.81 |
| 7 | | 8.505 | ASP | 0.339 | | | | |
| 8 | Lens 4 | −7.483 | ASP | 0.630 | Plastic | 1.572 | 56.0 | 1.88 |
| 9 | | −0.967 | ASP | 0.080 | | | | |
| 10 | Lens 5 | −0.837 | ASP | 0.275 | Plastic | 1.640 | 23.3 | −13.28 |
| 11 | | −1.048 | ASP | 0.228 | | | | |
| 12 | Lens 6 | 5.306 | ASP | 0.439 | Plastic | 1.535 | 55.7 | −2.55 |
| 13 | | 1.055 | ASP | 0.800 | | | | |
| 14 | IR-cut filter | Plano | | 0.200 | Glass | 1.517 | 64.2 | — |
| 15 | | Plano | | 0.611 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | −1.0181E+01 | −1.9979E+01 | −1.0384E+00 | −7.4674E+00 | −7.7027E+00 | −6.4138E+00 |
| A4 = | −1.5538E−02 | −2.3610E−02 | 1.0878E−02 | 4.5891E−02 | −6.0871E−02 | −4.5569E−02 |
| A6 = | −2.5122E−02 | −5.3819E−02 | −1.5487E−02 | −6.5324E−03 | 9.9929E−03 | −9.6459E−03 |
| A8 = | −1.4653E−02 | 2.7137E−02 | 1.8059E−02 | 1.0451E−03 | 1.4464E−02 | 4.8247E−03 |
| A10 = | 4.6576E−02 | 5.0878E−03 | −1.6131E−02 | −9.0295E−03 | −2.2600E−03 | −2.0164E−03 |
| A12 = | −4.9851E−02 | −1.3197E−02 | 8.2891E−03 | 6.9190E−03 | −2.5341E−04 | 1.4940E−03 |
| A14 = | 1.6196E−02 | 3.8896E−03 | −1.5166E−03 | −1.4806E−03 | | |

| Surface # | 8 | 9 | 10 | 11 | 12 | 13 |
|---|---|---|---|---|---|---|
| k = | −5.4422E+00 | −3.7310E+00 | −3.8303E+00 | −4.7987E+00 | −1.0000E+00 | −5.1561E+00 |
| A4 = | 2.9833E−02 | 3.0281E−02 | 3.8329E−02 | −1.1586E−02 | −7.6838E−02 | −4.4943E−02 |
| A6 = | −6.7109E−03 | −9.0034E−04 | −8.8126E−05 | 2.0801E−02 | 9.5553E−03 | 8.6519E−03 |
| A8 = | −1.0671E−02 | 2.2802E−04 | −2.5795E−04 | −4.7027E−03 | 7.2608E−04 | −1.1910E−03 |
| A10 = | 5.4230E−03 | −3.8514E−05 | 8.5620E−05 | 9.1318E−04 | −1.4594E−04 | 7.8675E−05 |
| A12 = | −1.2178E−03 | −4.4896E−05 | −4.4813E−05 | −2.0426E−04 | −8.9830E−06 | −3.4634E−07 |
| A14 = | 1.1017E−04 | | | 1.8259E−05 | 1.5084E−06 | −1.8373E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.25 | (R9 − R10)/(R9 + R10) | −0.11 |
| Fno | 2.05 | f/R11 | 0.80 |
| HFOV [deg.] | 39.0 | f/R2 | −1.57 |
| V4/V5 | 2.40 | f4/f3 | 0.02 |
| (V4 + V6)/V5 | 4.79 | f/f6 | −1.67 |
| CT5/CT3 | 0.50 | ImgH/Fno [mm] | 1.71 |
| (R5 − R6)/(R5 + R6) | −0.08 | | |

3rd Embodiment

Figure 3A:
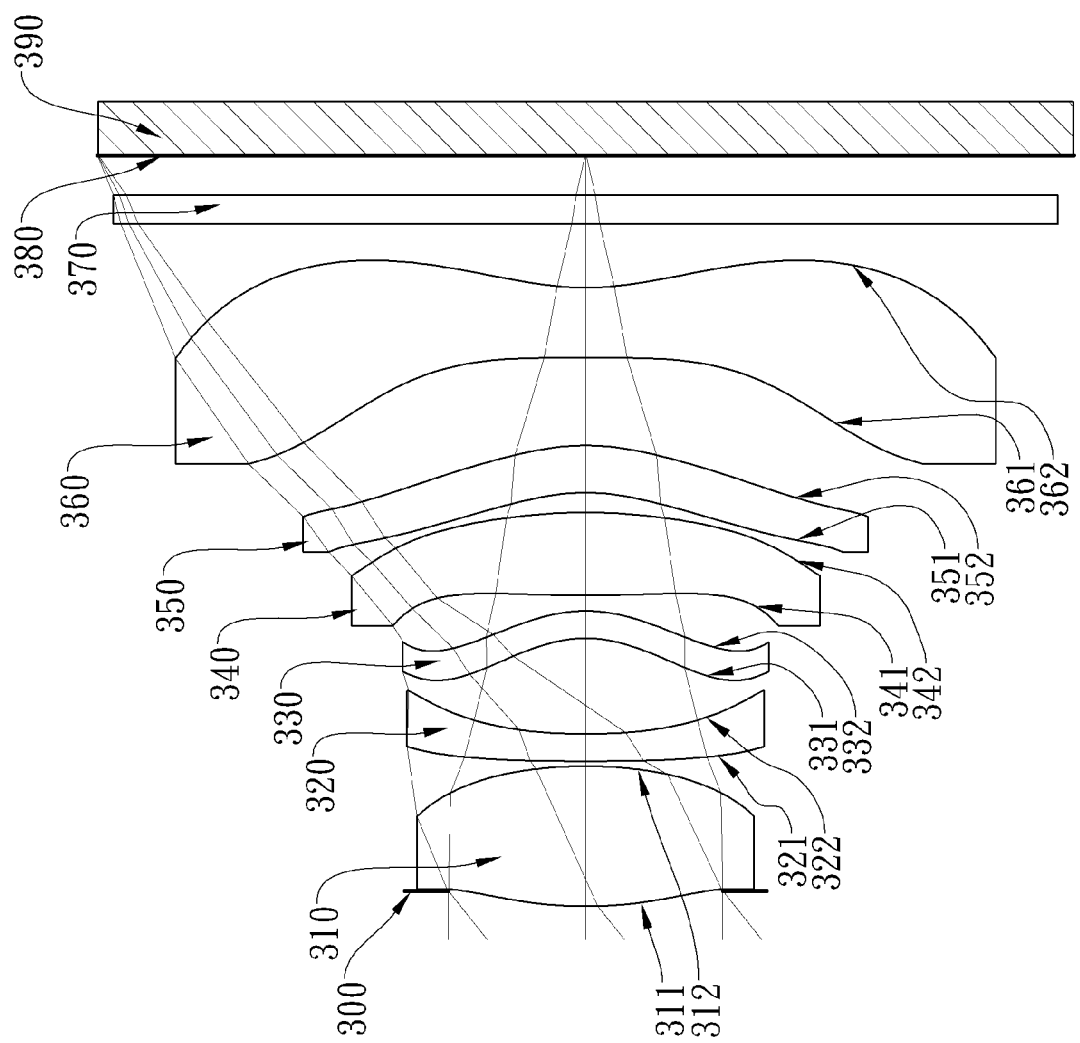
FIG. 3A is a schematic view of an imaging device according to the 3rd embodiment of the present disclosure.
Figure 3B:
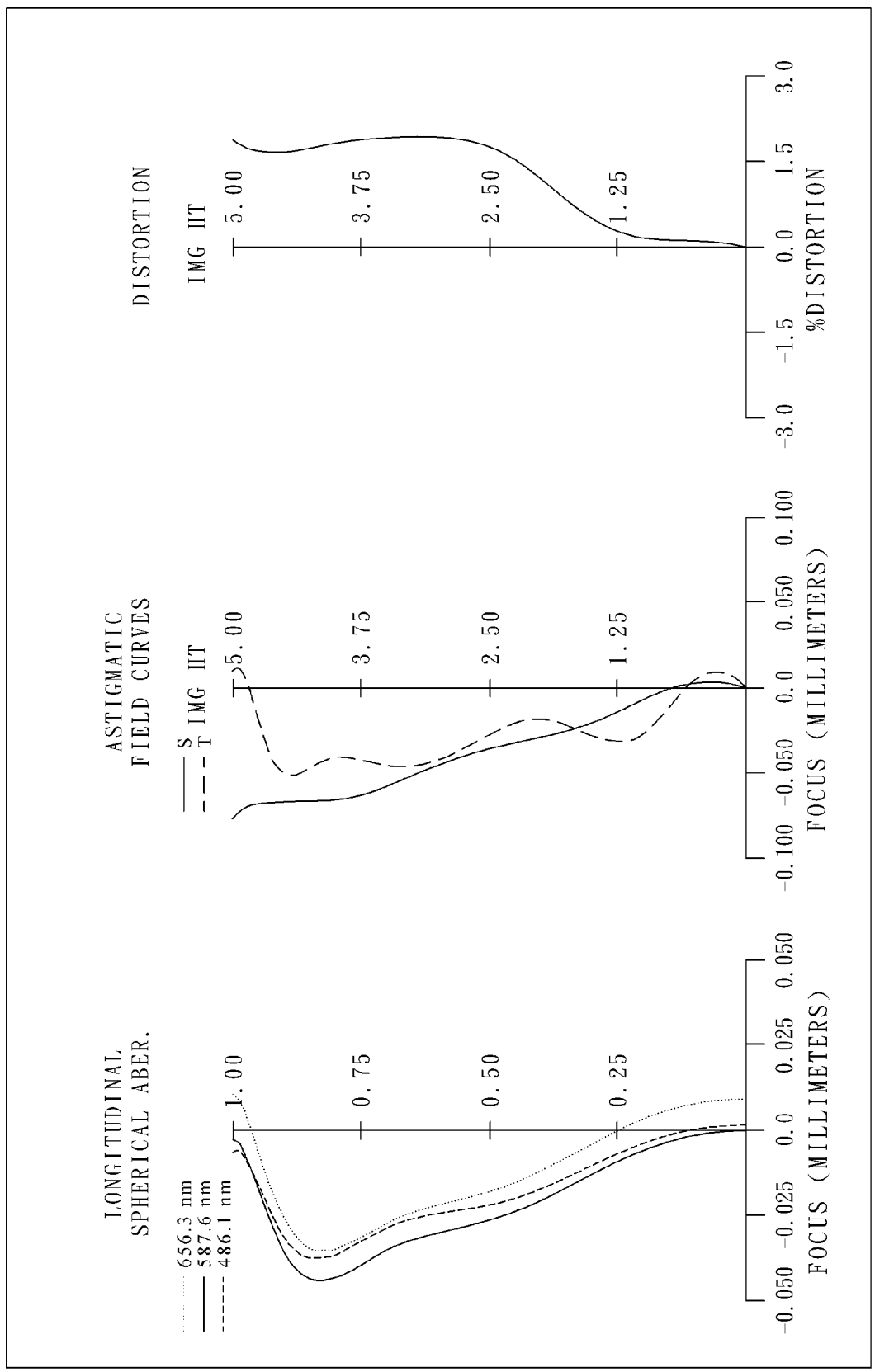
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging device according to the 3rd embodiment.

In FIG. 3A, the imaging device includes the imaging lens assembly (not otherwise herein labeled) of the present disclosure and an image sensor 390. The imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image plane 380, wherein the imaging lens assembly has a total of six lens elements (310-360) with refractive power.

The first lens element 310 with positive refractive power has a convex object-side surface 311 and a convex image-side surface 312, which are both aspheric, and the first lens element 310 is made of plastic material.

The second lens element 320 with negative refractive power has a convex object-side surface 321 and a concave image-side surface 322, which are both aspheric, and the second lens element 320 is made of plastic material.

The third lens element 330 with negative refractive power has a concave object-side surface 331 and a convex image-side surface 332, which are both aspheric, and the third lens element 330 is made of plastic material.

The fourth lens element 340 with positive refractive power has a convex object-side surface 341 and a convex image-side surface 342, which are both aspheric, and the fourth lens element 340 is made of plastic material.

The fifth lens element 350 with negative refractive power has a concave object-side surface 351 and a convex image-side surface 352, which are both aspheric, and the fifth lens element 350 is made of plastic material.

The sixth lens element 360 with negative refractive power has a concave object-side surface 361 in a paraxial region thereof and a concave image-side surface 362 in a paraxial region thereof, which are both aspheric, and the sixth lens element 360 is made of plastic material. Moreover, the image-side surface 362 of the sixth lens element 360 has at least one inflection point.

The IR-cut filter 370 is made of glass and located between the sixth lens element 360 and the image plane 380, and will not affect the focal length of the imaging lens assembly. The image sensor 390 is disposed on the image plane 380 of the imaging lens assembly.

The detailed optical data of the 3rd embodiment are shown in Table 5 and the aspheric surface data are shown in Table 6 below.

TABLE 5

Embodiment 3
f = 6.19 mm, Fno = 2.20, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.158 | | | | |
| 2 | Lens 1 | 3.973 | ASP | 1.438 | Plastic | 1.565 | 56.0 | 4.00 |
| 3 | | −4.544 | ASP | 0.050 | | | | |
| 4 | Lens 2 | 32.850 | ASP | 0.280 | Plastic | 1.650 | 21.4 | −10.59 |
| 5 | | 5.671 | ASP | 0.982 | | | | |
| 6 | Lens 3 | −1.303 | ASP | 0.281 | Plastic | 1.650 | 21.4 | −38.20 |
| 7 | | −1.492 | ASP | 0.159 | | | | |
| 8 | Lens 4 | 13.650 | ASP | 0.851 | Plastic | 1.565 | 56.0 | 7.06 |
| 9 | | −5.506 | ASP | 0.204 | | | | |
| 10 | Lens 5 | −1.988 | ASP | 0.484 | Plastic | 1.650 | 21.4 | −170.03 |
| 11 | | −2.218 | ASP | 0.900 | | | | |
| 12 | Lens 6 | −73.068 | ASP | 0.719 | Plastic | 1.565 | 56.5 | −4.82 |
| 13 | | 2.839 | ASP | 0.650 | | | | |
| 14 | IR-cut filter | Plano | | 0.300 | Glass | 1.517 | 64.2 | — |
| 15 | | Plano | | 0.404 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −5.5777E+00 | 2.2196E−01 | 3.0000E+00 | −5.8383E+00 | −2.1927E+00 | −2.2003E+00 |
| A4 = | 2.1753E−04 | −6.8579E−03 | 1.3855E−02 | 1.8232E−02 | 3.4008E−02 | 3.4452E−02 |
| A6 = | −2.9319E−03 | −6.3896E−03 | −5.3866E−03 | 5.3888E−05 | 5.2101E−03 | 2.5815E−03 |
| A8 = | −2.9469E−03 | 1.1150E−03 | 1.8352E−03 | 4.4522E−04 | 9.0423E−05 | −6.5371E−04 |
| A10 = | 2.0522E−03 | 2.1093E−04 | −4.4886E−04 | −3.3313E−04 | 4.2677E−05 | 1.6988E−04 |
| A12 = | −8.8184E−04 | −1.2702E−04 | 1.4151E−04 | 1.2264E−04 | −4.2746E−05 | 1.4445E−05 |
| A14 = | 1.1522E−04 | 5.4616E−06 | −1.9779E−05 | −2.2809E−05 | | |

| Surface # | 8 | 9 | 10 | 11 | 12 | 13 |
|---|---|---|---|---|---|---|
| k = | 3.0000E+00 | −2.0000E+01 | −9.5733E+00 | −1.0816E+01 | −1.0000E+00 | −1.2130E+01 |
| A4 = | −1.8105E−02 | −3.3831E−03 | 5.2608E−04 | −7.2495E−03 | −2.6303E−02 | −9.2037E−03 |
| A6 = | 1.0077E−03 | −1.2064E−03 | 2.6938E−04 | 2.0069E−03 | 1.5878E−03 | 4.5730E−04 |
| A8 = | −1.3154E−03 | −1.1147E−04 | 8.0696E−05 | −3.4114E−04 | 6.3901E−05 | −1.9062E−05 |
| A10 = | 1.7696E−04 | 2.2617E−06 | −4.0573E−06 | 4.8968E−05 | −4.6176E−06 | 7.1773E−07 |
| A12 = | −2.5266E−05 | 3.6559E−06 | −1.3351E−06 | −3.2403E−06 | −1.2845E−07 | −4.2842E−08 |
| A14 = | −7.7589E−07 | | | 3.5958E−08 | 6.7252E−09 | 9.7024E−10 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.19 | (R9 − R10)/(R9 + R10) | −0.05 |
| Fno | 2.20 | f/R11 | −0.08 |
| HFOV [deg.] | 38.5 | f/R2 | −1.36 |
| V4/V5 | 2.62 | f4/f3 | −0.18 |
| (V4 + V6)/V5 | 5.26 | f/f6 | −1.28 |
| CT5/CT3 | 1.72 | ImgH/Fno [mm] | 2.27 |
| (R5 − R6)/(R5 + R6) | −0.07 | | |

4th Embodiment

Figure 4A:
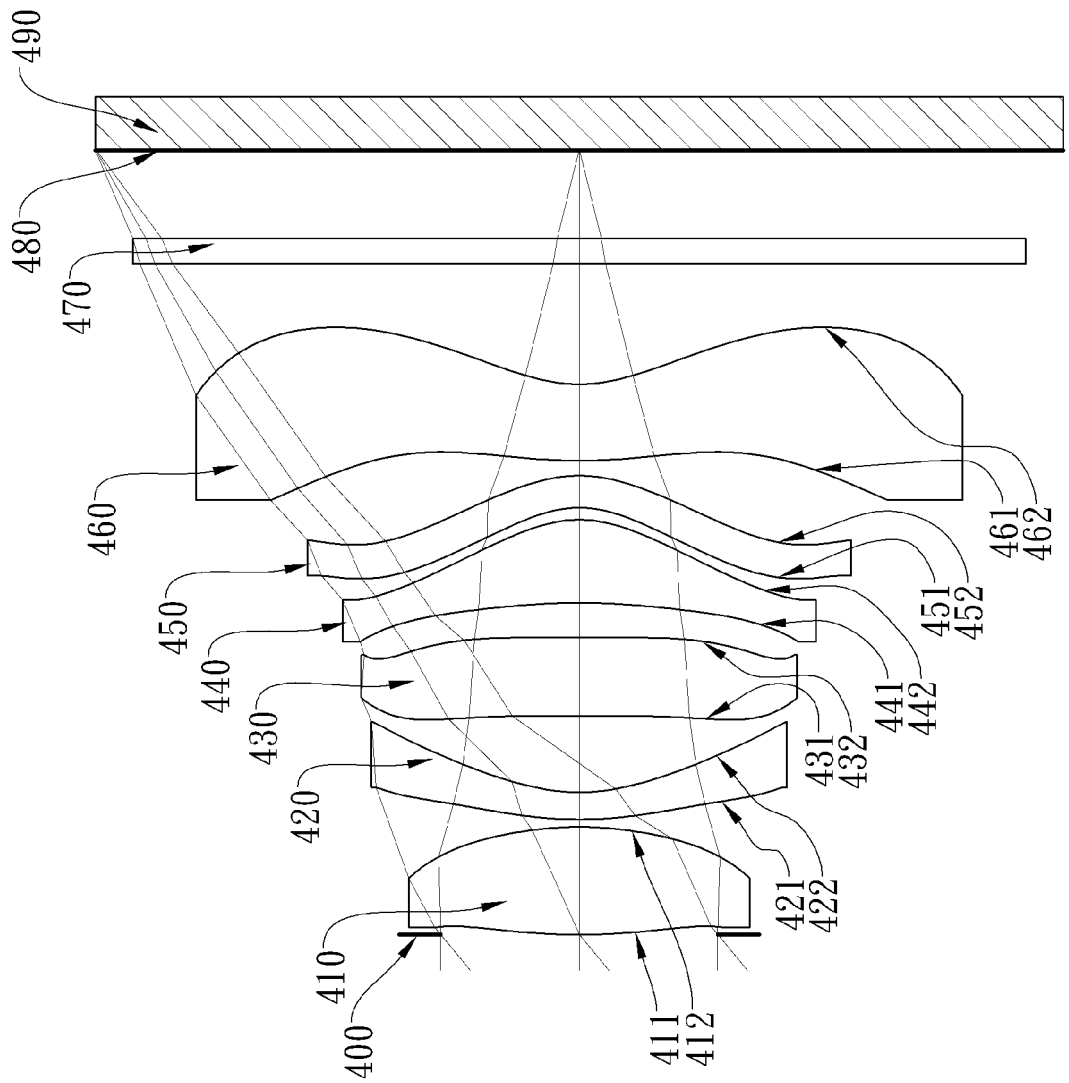
FIG. 4A is a schematic view of an imaging device according to the 4th embodiment of the present disclosure.
Figure 4B:
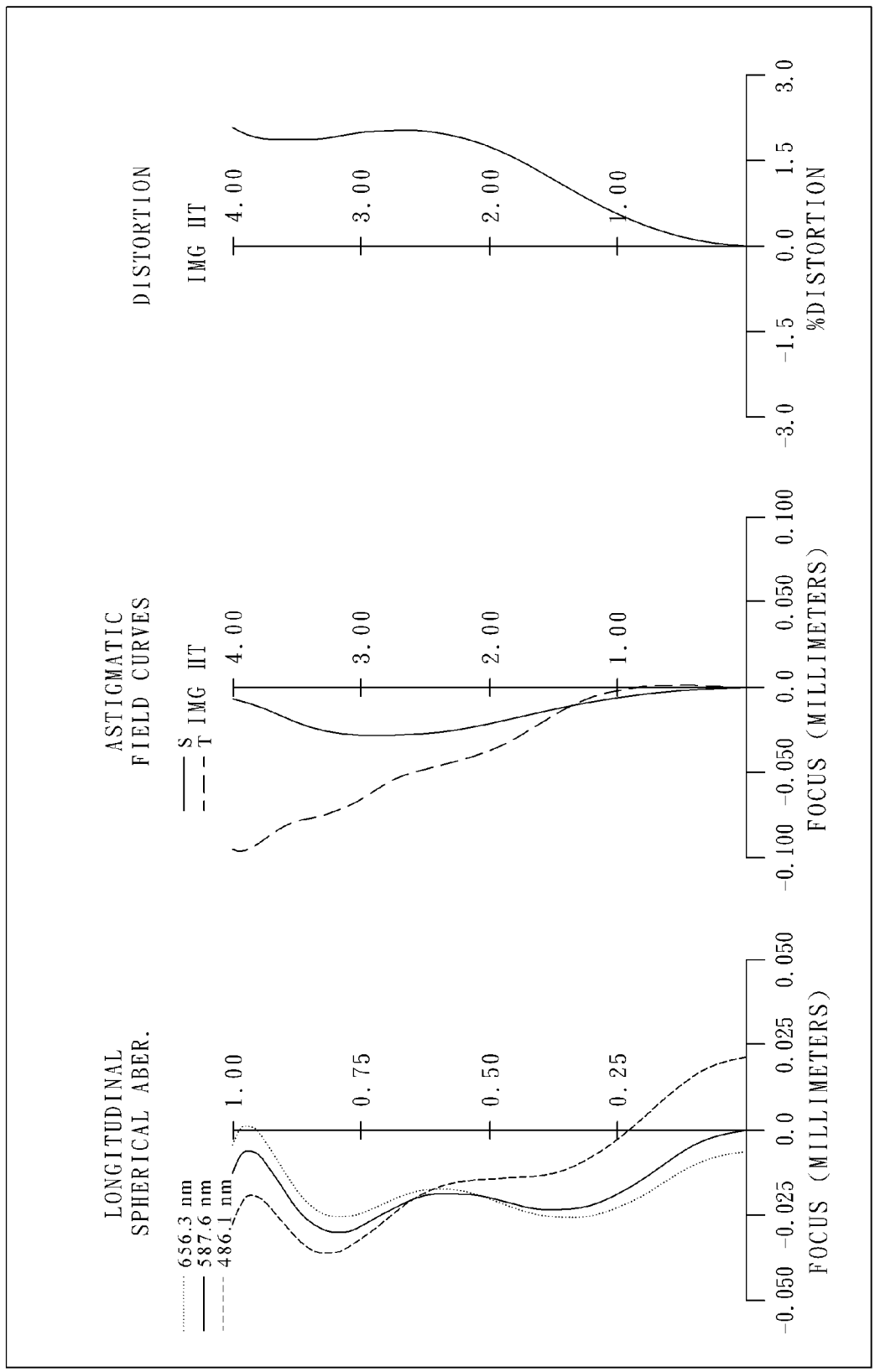
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging device according to the 4th embodiment.

In FIG. 4A, the imaging device includes the imaging lens assembly (not otherwise herein labeled) of the present disclosure and an image sensor 490. The imaging lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image plane 480, wherein the imaging lens assembly has a total of six lens elements (410-460) with refractive power.

The first lens element 410 with positive refractive power has a convex object-side surface 411 and a convex image-side surface 412, which are both aspheric, and the first lens element 410 is made of plastic material.

The second lens element 420 with negative refractive power has a convex object-side surface 421 and a concave image-side surface 422, which are both aspheric, and the second lens element 420 is made of plastic material.

The third lens element 430 with positive refractive power has a convex object-side surface 431 and a concave image-side surface 432, which are both aspheric, and the third lens element 430 is made of plastic material.

The fourth lens element 440 with positive refractive power has a concave object-side surface 441 and a convex image-side surface 442, which are both aspheric, and the fourth lens element 440 is made of plastic material.

The fifth lens element 450 with negative refractive power has a concave object-side surface 451 and a convex image-side surface 452, which are both aspheric, and the fifth lens element 450 is made of plastic material.

The sixth lens element 460 with negative refractive power has a convex object-side surface 461 in a paraxial region thereof and a concave image-side surface 462 in a paraxial region thereof, which are both aspheric, and the sixth lens element 460 is made of plastic material. Moreover, both of the object-side surface 461 and the image-side surface 462 of the sixth lens element 460 have at least one inflection point.

The IR-cut filter 470 is made of glass and located between the sixth lens element 460 and the image plane 480, and will not affect the focal length of the imaging lens assembly. The image sensor 490 is disposed on the image plane 480 of the imaging lens assembly.

The detailed optical data of the 4th embodiment are shown in Table 7 and the aspheric surface data are shown in Table 8 below.

TABLE 7

Embodiment 4
f = 4.77 mm, Fno = 2.08, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.002 | | | | |
| 2 | Lens 1 | 4.878 | ASP | 0.893 | Plastic | 1.544 | 55.9 | 3.37 |
| 3 | | −2.744 | ASP | 0.062 | | | | |
| 4 | Lens 2 | 2.959 | ASP | 0.225 | Plastic | 1.632 | 23.4 | −5.09 |
| 5 | | 1.496 | ASP | 0.632 | | | | |
| 6 | Lens 3 | 88.752 | ASP | 0.650 | Plastic | 1.544 | 55.9 | 98816.45 |
| 7 | | 88.670 | ASP | 0.288 | | | | |
| 8 | Lens 4 | −5.157 | ASP | 0.689 | Plastic | 1.544 | 55.9 | 2.05 |
| 9 | | −0.959 | ASP | 0.100 | | | | |
| 10 | Lens 5 | −0.855 | ASP | 0.265 | Plastic | 1.632 | 23.4 | −9.30 |
| 11 | | −1.121 | ASP | 0.124 | | | | |
| 12 | Lens 6 | 4.226 | ASP | 0.632 | Plastic | 1.544 | 55.9 | −3.18 |
| 13 | | 1.163 | ASP | 1.000 | | | | |
| 14 | IR-cut filter | Plano | | 0.210 | Glass | 1.517 | 64.2 | — |
| 15 | | Plano | | 0.730 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −8.8811E+00 | −2.0000E+01 | −1.9484E+01 | −7.3338E+00 | −2.0000E+01 | 3.0000E+00 |
| A4 = | −1.0443E−02 | −2.9764E−02 | 6.7322E−03 | 2.8978E−02 | −3.7272E−02 | −2.9647E−02 |
| A6 = | −1.3666E−02 | −2.4569E−02 | −1.1258E−02 | −8.2659E−03 | 6.5581E−03 | −4.8735E−03 |
| A8 = | −5.7954E−03 | 1.1569E−02 | 4.2964E−03 | 9.3716E−04 | 5.9313E−03 | 1.6990E−03 |
| A10 = | 1.2328E−02 | −1.8497E−04 | −3.2398E−03 | −2.2782E−03 | −9.4282E−04 | −7.6413E−04 |
| A12 = | −1.1073E−02 | −2.6615E−03 | 2.0011E−03 | 1.6124E−03 | −1.7093E−05 | 3.6007E−04 |
| A14 = | 2.8946E−03 | 7.0797E−04 | −3.5136E−04 | −2.9070E−04 | | |

| Surface # | 8 | 9 | 10 | 11 | 12 | 13 |
|---|---|---|---|---|---|---|
| k = | −1.1005E+01 | −3.2958E+00 | −3.3264E+00 | −4.0180E+00 | −1.0000E+00 | −4.7185E+00 |
| A4 = | 1.9504E−02 | 1.6634E−02 | 2.5057E−02 | −8.7835E−03 | −5.4704E−02 | −3.0035E−02 |
| A6 = | −4.7631E−03 | −4.6373E−04 | 2.9248E−04 | 1.1656E−02 | 4.2411E−03 | 4.3927E−03 |
| A8 = | −4.2898E−03 | 9.4314E−05 | 8.0160E−05 | −1.7779E−03 | 3.6467E−04 | −4.7339E−04 |
| A10 = | 1.7401E−03 | 7.2497E−06 | 4.8520E−05 | 2.6538E−04 | −5.1759E−05 | 2.4138E−05 |
| A12 = | −2.4335E−04 | 9.5942E−06 | −1.8129E−05 | −4.9482E−05 | −2.6529E−06 | −1.1333E−07 |
| A14 = | 7.6975E−06 | | | 3.2003E−06 | 4.1506E−07 | −3.8761E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.77 | (R9 − R10)/(R9 + R10) | −0.13 |
| Fno | 2.08 | f/R11 | 1.13 |
| HFOV [deg.] | 39.5 | f/R2 | −1.74 |
| V4/V5 | 2.39 | f4/f3 | 0.00 |
| (V4 + V6)/V5 | 4.78 | f/f6 | −1.50 |

-continued

| 4th Embodiment | | | |
|---|---|---|---|
| CT5/CT3 | 0.41 | ImgH/Fno [mm] | 1.92 |
| (R5 − R6)/(R5 + R6) | 0.00 | | |

5th Embodiment

Figure 5A:
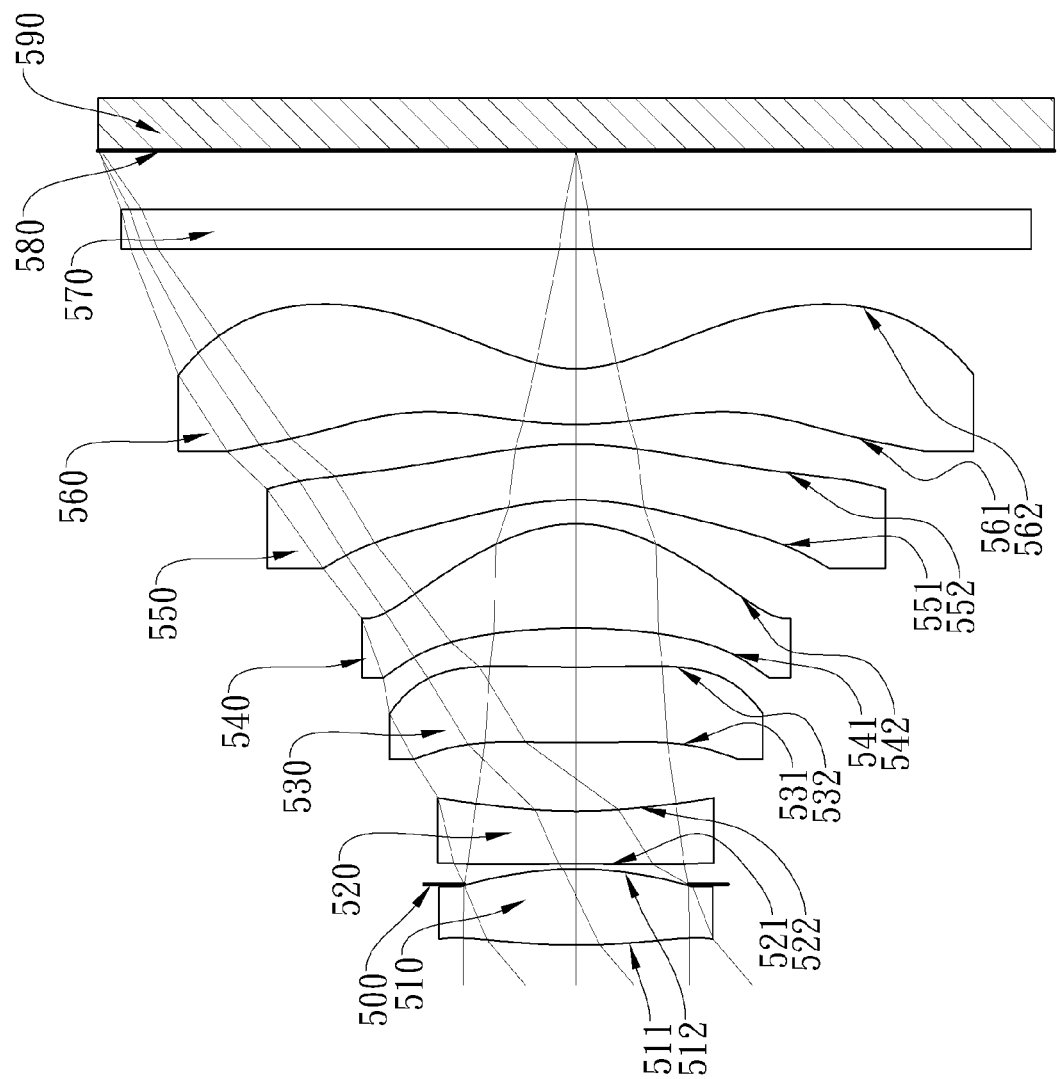
FIG. 5A is a schematic view of an imaging device according to the 5th embodiment of the present disclosure.
Figure 5B:
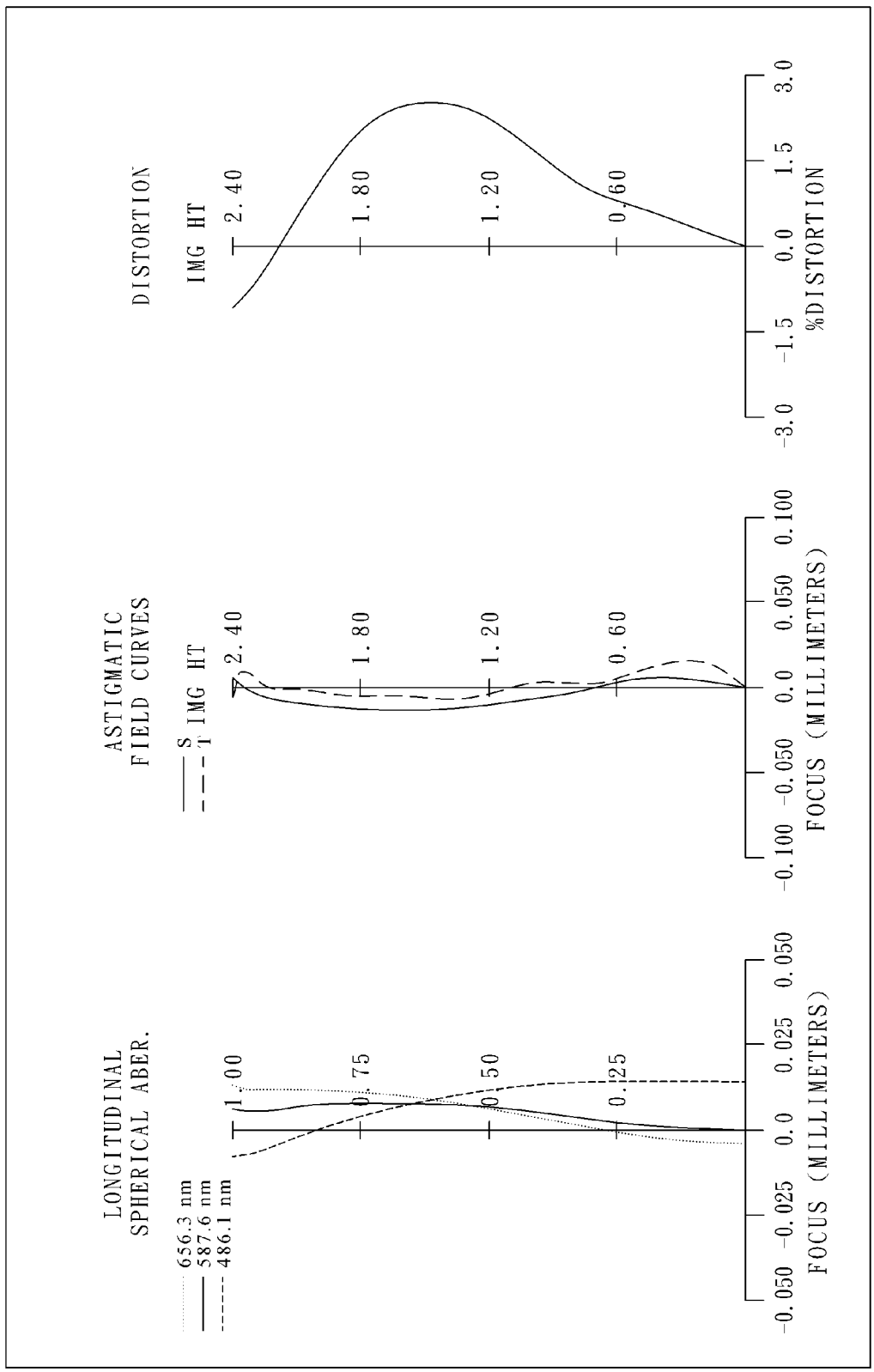
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging device according to the 5th embodiment.

In FIG. 5A, the imaging device includes the imaging lens assembly (not otherwise herein labeled) of the present disclosure and an image sensor 590. The imaging lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image plane 580, wherein the imaging lens assembly has a total of six lens elements (510-560) with refractive power.

The first lens element 510 with positive refractive power has a convex object-side surface 511 and a convex image-side surface 512, which are both aspheric, and the first lens element 510 is made of plastic material.

The second lens element 520 with negative refractive power has a concave object-side surface 521 and a concave image-side surface 522, which are both aspheric, and the second lens element 520 is made of plastic material.

The third lens element 530 with positive refractive power has a convex object-side surface 531 and a concave image-side surface 532, which are both aspheric, and the third lens element 530 is made of plastic material.

The fourth lens element 540 with positive refractive power has a concave object-side surface 541 and a convex image-side surface 542, which are both aspheric, and the fourth lens element 540 is made of plastic material.

The fifth lens element 550 with negative refractive power has a concave object-side surface 551 and a convex image-side surface 552, which are both aspheric, and the fifth lens element 550 is made of plastic material.

The sixth lens element 560 with negative refractive power has a convex object-side surface 561 in a paraxial region thereof and a concave image-side surface 562 in a paraxial region thereof, which are both aspheric, and the sixth lens element 560 is made of plastic material. Moreover, both of the object-side surface 561 and the image-side surface 562 of the sixth lens element 560 have at least one inflection point.

The IR-cut filter 570 is made of glass and located between the sixth lens element 560 and the image plane 580, and will not affect the focal length of the imaging lens assembly. The image sensor 590 is disposed on the image plane 580 of the imaging lens assembly.

The detailed optical data of the 5th embodiment are shown in Table 9 and the aspheric surface data are shown in Table 10 below.

TABLE 9

Embodiment 5
f = 2.84 mm, Fno = 2.50, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.946 | ASP | 0.384 | Plastic | 1.544 | 55.9 | 1.99 |
| 2 | | −1.637 | ASP | −0.078 | | | | |
| 3 | Ape. Stop | Plano | | 0.103 | | | | |
| 4 | Lens 2 | −9.240 | ASP | 0.265 | Plastic | 1.634 | 23.8 | −3.00 |
| 5 | | 2.425 | ASP | 0.343 | | | | |
| 6 | Lens 3 | 5.936 | ASP | 0.381 | Plastic | 1.535 | 56.3 | 89.07 |
| 7 | | 6.630 | ASP | 0.197 | | | | |
| 8 | Lens 4 | −3.000 | ASP | 0.524 | Plastic | 1.535 | 56.3 | 1.66 |
| 9 | | −0.727 | ASP | 0.120 | | | | |
| 10 | Lens 5 | −1.416 | ASP | 0.280 | Plastic | 1.640 | 23.3 | −18.49 |
| 11 | | −1.732 | ASP | 0.100 | | | | |
| 12 | Lens 6 | 1.932 | ASP | 0.280 | Plastic | 1.544 | 55.9 | −2.03 |
| 13 | | 0.667 | ASP | 0.600 | | | | |
| 14 | IR-cut filter | Plano | | 0.200 | Glass | 1.517 | 64.2 | — |
| 15 | | Plano | | 0.295 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −8.7502E+00 | −1.6907E+01 | −2.0000E+01 | −4.5517E+01 | −1.0669E+01 | −1.1947E+01 |
| A4 = | −8.7837E−02 | −4.8697E−02 | 2.0725E−01 | −1.0836E−02 | −3.8751E−01 | −2.2305E−01 |
| A6 = | −1.4586E−01 | −2.2020E−01 | −1.6768E−01 | 2.2593E−02 | 2.7870E−02 | −1.7012E−01 |
| A8 = | −7.4148E−02 | 8.8589E−02 | 9.8324E−02 | 1.8970E−01 | 1.8825E−01 | 4.6161E−02 |
| A10 = | −2.2226E−01 | −2.8603E−01 | −1.7203E−01 | −4.9855E−01 | −2.7223E−01 | −1.3169E−01 |
| A12 = | 6.7606E−01 | 2.3588E−01 | 5.4971E−01 | 5.6366E−01 | 2.9962E−01 | 7.0192E−02 |
| A14 = | −9.0247E−01 | 2.2982E−01 | −3.9286E−01 | 1.1251E−01 | | |

| Surface # | 8 | 9 | 10 | 11 | 12 | 13 |
|---|---|---|---|---|---|---|
| k = | 1.8182E+00 | −2.2685E+00 | −6.3453E+00 | −2.5751E+01 | −1.0000E+00 | −3.9569E+00 |
| A4 = | 3.3009E−02 | −1.0261E−02 | 8.1742E−02 | −4.1044E−02 | −3.0776E−01 | −1.4736E−01 |
| A6 = | −5.6545E−02 | −4.1149E−02 | −3.1512E−02 | 1.2077E−01 | 7.7300E−02 | 5.9485E−02 |
| A8 = | −3.1323E−01 | 2.6911E−02 | −2.4047E−02 | −1.1900E−01 | 1.4285E−02 | −1.5754E−02 |
| A10 = | 3.1242E−01 | 2.3504E−02 | 2.0010E−03 | 6.3582E−02 | −6.0844E−03 | 1.6032E−03 |
| A12 = | −1.2764E−01 | 1.9066E−02 | 3.4830E−03 | −1.8311E−02 | −5.9161E−04 | 6.9521E−05 |
| A14 = | 6.2010E−02 | | | 2.1243E−03 | 2.4098E−04 | −2.0609E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.84 | (R9 − R10)/(R9 + R10) | −0.10 |
| Fno | 2.50 | f/R11 | 1.47 |
| HFOV [deg.] | 40.5 | f/R2 | −1.74 |
| V4/V5 | 2.42 | f4/f3 | 0.02 |
| (V4 + V6)/V5 | 4.82 | f/f6 | −1.40 |
| CT5/CT3 | 0.73 | ImgH/Fno [mm] | 0.96 |
| (R5 − R6)/(R5 + R6) | −0.06 | | |

6th Embodiment

Figure 6A:
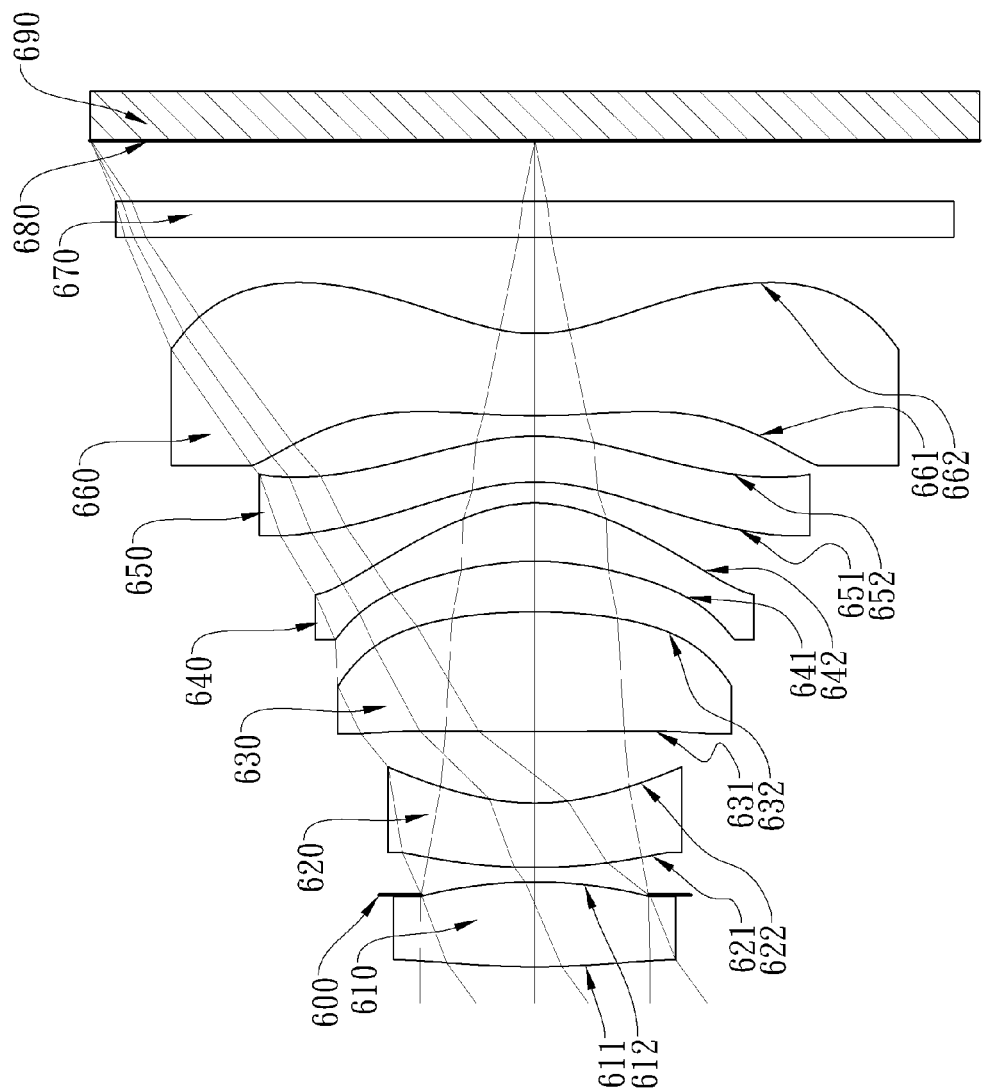
FIG. 6A is a schematic view of an imaging device according to the 6th embodiment of the present disclosure.
Figure 6B:
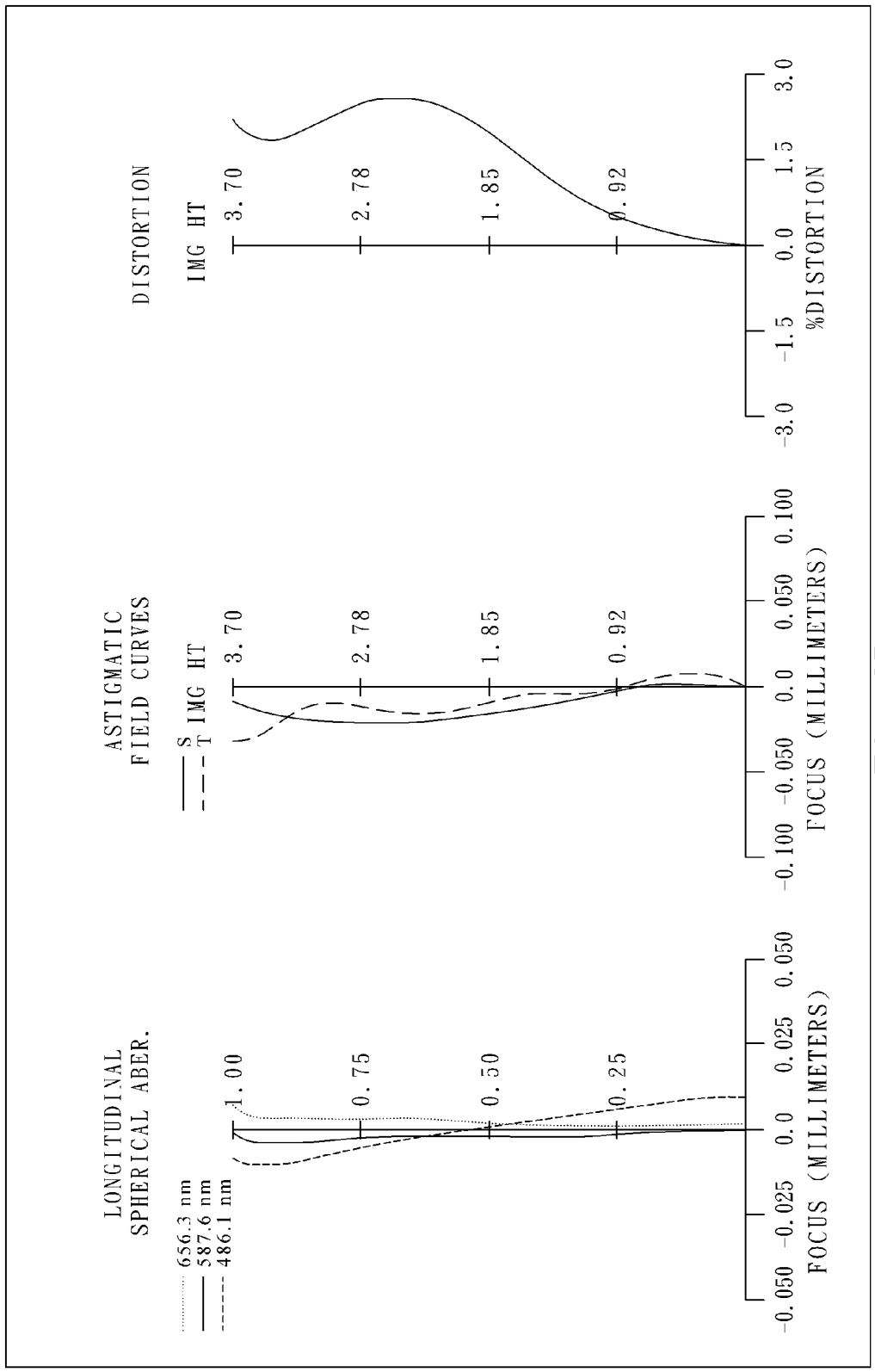
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging device according to the 6th embodiment.

In FIG. 6A, the imaging device includes the imaging lens assembly (not otherwise herein labeled) of the present disclosure and an image sensor 690. The imaging lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image plane 680, wherein the imaging lens assembly has a total of six lens elements (610-660) with refractive power.

The first lens element 610 with positive refractive power has a convex object-side surface 611 and a convex image-side surface 612, which are both aspheric, and the first lens element 610 is made of plastic material.

The second lens element 620 with negative refractive power has a convex object-side surface 621 and a concave image-side surface 622, which are both aspheric, and the second lens element 620 is made of plastic material.

The third lens element 630 with positive refractive power has a convex object-side surface 631 and a convex image-side surface 632, which are both aspheric, and the third lens element 630 is made of plastic material.

The fourth lens element 640 with positive refractive power has a concave object-side surface 641 and a convex image-side surface 642, which are both aspheric, and the fourth lens element 640 is made of plastic material.

The fifth lens element 650 with negative refractive power has a concave object-side surface 651 and a convex image-side surface 652, which are both aspheric, and the fifth lens element 650 is made of plastic material.

The sixth lens element 660 with negative refractive power has a convex object-side surface 661 in a paraxial region thereof and a concave image-side surface 662 in a paraxial region thereof, which are both aspheric, and the sixth lens element 660 is made of plastic material. Moreover, both of the object-side surface 661 and the image-side surface 662 of the sixth lens element 660 have at least one inflection point.

The IR-cut filter 670 is made of glass and located between the sixth lens element 660 and the image plane 680, and will not affect the focal length of the imaging lens assembly. The image sensor 690 is disposed on the image plane 680 of the imaging lens assembly.

The detailed optical data of the 6th embodiment are shown in Table 11 and the aspheric surface data are shown in Table 12 below.

TABLE 11

Embodiment 6
f = 4.98 mm, Fno = 2.60, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.771 | ASP | 0.707 | Plastic | 1.535 | 56.3 | 4.44 |
| 2 | | −3.526 | ASP | −0.109 | | | | |
| 3 | Ape. Stop | Plano | | 0.228 | | | | |
| 4 | Lens | 24.406 | ASP | 0.537 | Plastic | 1.650 | 21.4 | −6.25 |
| 5 | | 2.012 | ASP | 0.593 | | | | |
| 6 | Lens 3 | 20.229 | ASP | 1.000 | Plastic | 1.535 | 56.3 | 7.12 |
| 7 | | −4.607 | ASP | 0.420 | | | | |
| 8 | Lens 4 | −2.436 | ASP | 0.485 | Plastic | 1.535 | 56.3 | 4.17 |
| 9 | | −1.244 | ASP | 0.176 | | | | |
| 10 | Lens 5 | −1.719 | ASP | 0.382 | Plastic | 1.640 | 23.3 | −55.41 |
| 11 | | −1.963 | ASP | 0.169 | | | | |
| 12 | Lens 6 | 5.827 | ASP | 0.685 | Plastic | 1.530 | 55.8 | −3.40 |
| 13 | | 1.321 | ASP | 0.800 | | | | |
| 14 | IR-cut filter | Plano | | 0.300 | Glass | 1.517 | 64.2 | — |
| 15 | | Plano | | 0.507 | | | | |
| 16 | Image | Plano | | — | | | | |

Note:
Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | −1.3967E+01 | −2.0000E+01 | 2.8545E+00 | −6.2798E+00 | 3.0000E+00 | −6.9468E+00 |
| A4 = | −1.0037E−02 | −1.9134E−02 | −8.0236E−03 | 2.0628E−02 | −1.8379E−02 | −1.2831E−02 |
| A6 = | −7.0300E−03 | −3.5339E−03 | −8.5918E−03 | −7.7006E−03 | −4.6794E−03 | −1.5216E−02 |
| A8 = | 4.8854E−03 | 2.0537E−03 | 1.1233E−02 | 5.0350E−03 | 8.4463E−03 | 2.7420E−03 |
| A10 = | −6.7270E−03 | −3.4273E−03 | −1.2533E−02 | −4.7644E−03 | −4.4209E−03 | −1.1273E−03 |
| A12 = | 3.5716E−03 | 4.7733E−04 | 5.9325E−03 | 2.1920E−03 | 8.5499E−04 | 8.1002E−05 |
| A14 = | −8.6159E−04 | 5.1032E−04 | −1.1797E−03 | −3.6305E−04 | | |

| Surface # | 8 | 9 | 10 | 11 | 12 | 13 |
|---|---|---|---|---|---|---|
| k = | −7.0197E+00 | −2.5891E+00 | −5.4499E+00 | −9.1347E+00 | −1.0000E+00 | −5.2707E+00 |
| A4 = | −6.1183E−03 | 1.0730E−02 | 1.4450E−02 | −3.1655E−03 | −5.5661E−02 | −2.7578E−02 |
| A6 = | −1.7175E−04 | −5.6730E−03 | 2.0842E−04 | 1.1596E−02 | 4.5931E−03 | 4.0386E−03 |
| A8 = | −8.7871E−03 | 7.8826E−04 | −2.6073E−04 | −4.4821E−03 | 3.7637E−04 | −4.9423E−04 |
| A10 = | 3.7857E−03 | 2.4633E−04 | 1.3657E−06 | 9.3362E−04 | −8.7476E−05 | 2.8605E−05 |
| A12 = | −1.0836E−03 | −6.1865E−06 | 4.1803E−06 | −1.0224E−04 | −1.2291E−06 | −6.7464E−07 |
| A14 = | 1.3160E−04 | | | 4.6391E−06 | 1.0857E−06 | −1.4648E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.98 | (R9 − R10)/(R9 + R10) | −0.07 |
| Fno | 2.60 | f/R11 | 0.85 |
| HFOV [deg.] | 36.0 | f/R2 | −1.41 |
| V4/V5 | 2.42 | f4/f3 | 0.59 |
| (V4 + V6)/V5 | 4.81 | f/f6 | −1.46 |
| CT5/CT3 | 0.38 | ImgH/Fno [mm] | 1.42 |
| (R5 − R6)/(R5 + R6) | 1.59 | | |

7th Embodiment

Figure 7A:
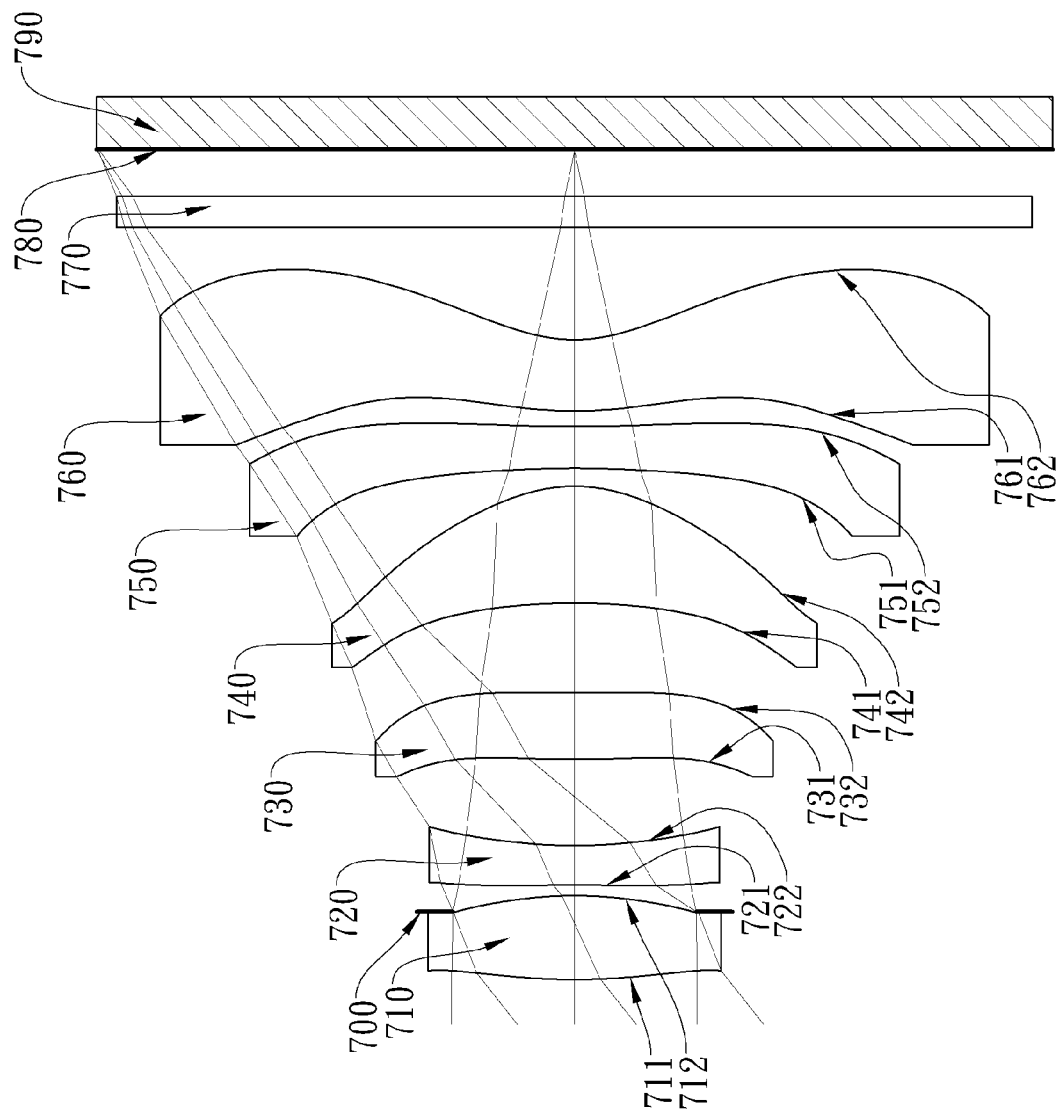
FIG. 7A is a schematic view of an imaging device according to the 7th embodiment of the present disclosure.
Figure 7B:
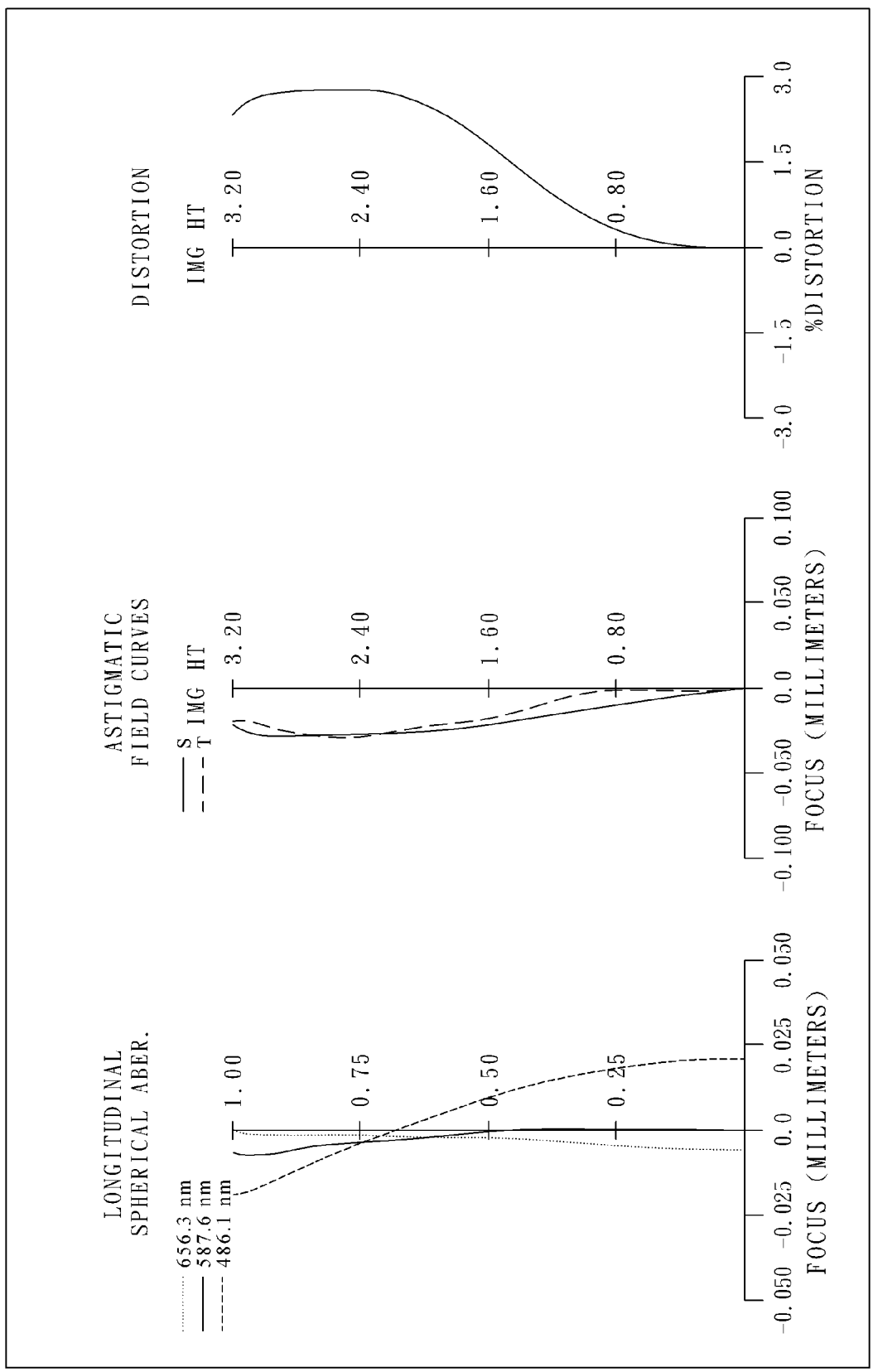
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging device according to the 7th embodiment.

In FIG. 7A, the imaging device includes the imaging lens assembly (not otherwise herein labeled) of the present disclosure and an image sensor 790. The imaging lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image plane 780, wherein the imaging lens assembly has a total of six lens elements (710-760) with refractive power.

The first lens element 710 with positive refractive power has a convex object-side surface 711 and a convex image-side surface 712, which are both aspheric, and the first lens element 710 is made of plastic material.

The second lens element 720 with negative refractive power has a concave object-side surface 721 and a concave image-side surface 722, which are both aspheric, and the second lens element 720 is made of plastic material.

The third lens element 730 with positive refractive power has a convex object-side surface 731 and a concave image-side surface 732, which are both aspheric, and the third lens element 730 is made of plastic material.

The fourth lens element 740 with positive refractive power has a concave object-side surface 741 and a convex image-side surface 742, which are both aspheric, and the fourth lens element 740 is made of plastic material.

The fifth lens element 750 with negative refractive power has a concave object-side surface 751 and a concave image-side surface 752, which are both aspheric, and the fifth lens element 750 is made of plastic material.

The sixth lens element 760 with negative refractive power has a convex object-side surface 761 in a paraxial region thereof and a concave image-side surface 762 in a paraxial region thereof, which are both aspheric, and the sixth lens element 760 is made of plastic material. Moreover, both of the object-side surface 761 and the image-side surface 762 of the sixth lens element 760 have at least one inflection point.

The IR-cut filter 770 is made of glass and located between the sixth lens element 760 and the image plane 780, and will not affect the focal length of the imaging lens assembly. The image sensor 790 is disposed on the image plane 780 of the imaging lens assembly.

The detailed optical data of the 7th embodiment are shown in Table 13 and the aspheric surface data are shown in Table 14 below.

TABLE 13

Embodiment 7
f = 3.95 mm, Fno = 2.40, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.949 | ASP | 0.563 | Plastic | 1.544 | 55.9 | 2.96 |
| 2 | | −2.581 | ASP | −0.107 | | | | |
| 3 | Ape. Stop | Plano | | 0.177 | | | | |
| 4 | Lens 2 | −20.515 | ASP | 0.265 | Plastic | 1.634 | 23.8 | −4.34 |
| 5 | | 3.190 | ASP | 0.578 | | | | |
| 6 | Lens 3 | 7.250 | ASP | 0.448 | Plastic | 1.544 | 55.9 | 17.62 |
| 7 | | 29.110 | ASP | 0.599 | | | | |
| 8 | Lens 4 | −4.452 | ASP | 0.784 | Plastic | 1.535 | 56.3 | 2.33 |
| 9 | | −1.034 | ASP | 0.120 | | | | |
| 10 | Lens 5 | −7.756 | ASP | 0.280 | Plastic | 1.640 | 23.3 | −6.69 |
| 11 | | 9.677 | ASP | 0.104 | | | | |
| 12 | Lens 6 | 2.700 | ASP | 0.478 | Plastic | 1.544 | 55.9 | −3.30 |
| 13 | | 1.011 | ASP | 0.750 | | | | |
| 14 | IR-cut filter | Plano | | 0.210 | Glass | 1.517 | 64.2 | — |
| 15 | | Plano | | 0.315 | | | | |
| 16 | Image | Plano | | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | −6.3877E+00 | −1.9720E+01 | 3.0000E+00 | −3.3621E+01 | 3.0000E+00 | −9.2587E+00 |
| A4 = | −2.7591E−02 | −2.1825E−02 | 6.4036E−02 | 2.2044E−02 | −1.1348E−01 | −8.5952E−02 |
| A6 = | −2.1332E−02 | −3.6086E−02 | −1.9739E−02 | 6.9490E−03 | −2.5715E−03 | −2.2623E−02 |
| A8 = | −7.1007E−03 | 1.8236E−02 | 1.9567E−02 | 1.1037E−02 | 1.0616E−02 | 1.0494E−02 |
| A10 = | −1.2589E−02 | −1.8073E−02 | −1.8592E−02 | −2.2037E−02 | −1.5673E−02 | −4.6839E−03 |
| A12 = | 1.9307E−02 | 3.6629E−03 | 1.4630E−02 | 2.2933E−02 | 8.1293E−03 | 5.1014E−04 |
| A14 = | −1.0583E−02 | 2.8955E−03 | −4.9496E−03 | −7.5622E−03 | | |

| Surface # | 8 | 9 | 10 | 11 | 12 | 13 |
|---|---|---|---|---|---|---|
| k = | 1.8580E+00 | −2.8867E+00 | −2.0000E+01 | −2.0000E+01 | −1.0000E+00 | −3.9904E+00 |
| A4 = | −5.6673E−03 | −2.0595E−02 | 6.3958E−03 | −3.9090E−02 | −1.0741E−01 | −4.9734E−02 |
| A6 = | −6.3090E−03 | −9.8838E−03 | −7.9142E−03 | 2.1082E−02 | 1.2863E−02 | 1.0902E−02 |
| A8 = | −2.3922E−02 | 2.0454E−05 | −1.9175E−04 | −1.1153E−02 | 1.2688E−03 | −1.5554E−03 |
| A10 = | 1.5919E−02 | 2.9552E−04 | 5.0211E−06 | 3.1287E−03 | −2.9055E−04 | 9.2486E−05 |
| A12 = | −3.5892E−03 | 3.6448E−04 | 2.1726E−06 | −4.4755E−04 | −1.2517E−05 | 2.0780E−06 |
| A14 = | 3.4380E−04 | | | 2.6015E−05 | 3.1634E−06 | −3.9678E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.95 | (R9 − R10)/(R9 + R10) | −9.07 |
| Fno | 2.40 | f/R11 | 1.46 |
| HFOV [deg.] | 38.4 | f/R2 | −1.53 |
| V4/V5 | 2.42 | f4/f3 | 0.13 |
| (V4 + V6)/V5 | 4.82 | f/f6 | −1.20 |
| CT5/CT3 | 0.63 | ImgH/Fno [mm] | 1.33 |
| (R5 − R6)/(R5 + R6) | −0.60 | | |

8th Embodiment

Figure 8A:
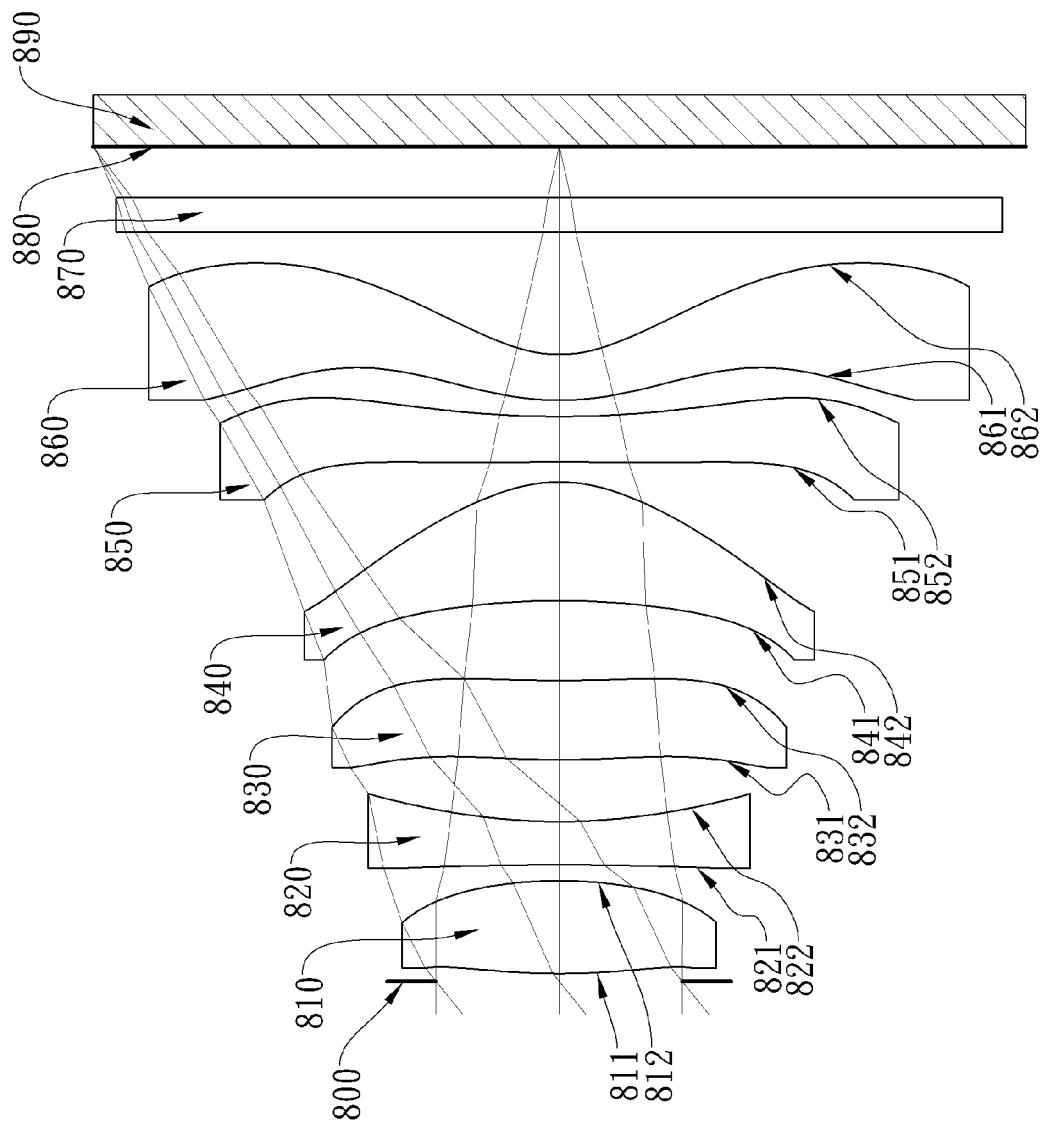
FIG. 8A is a schematic view of an imaging device according to the 8th embodiment of the present disclosure.
Figure 8B:
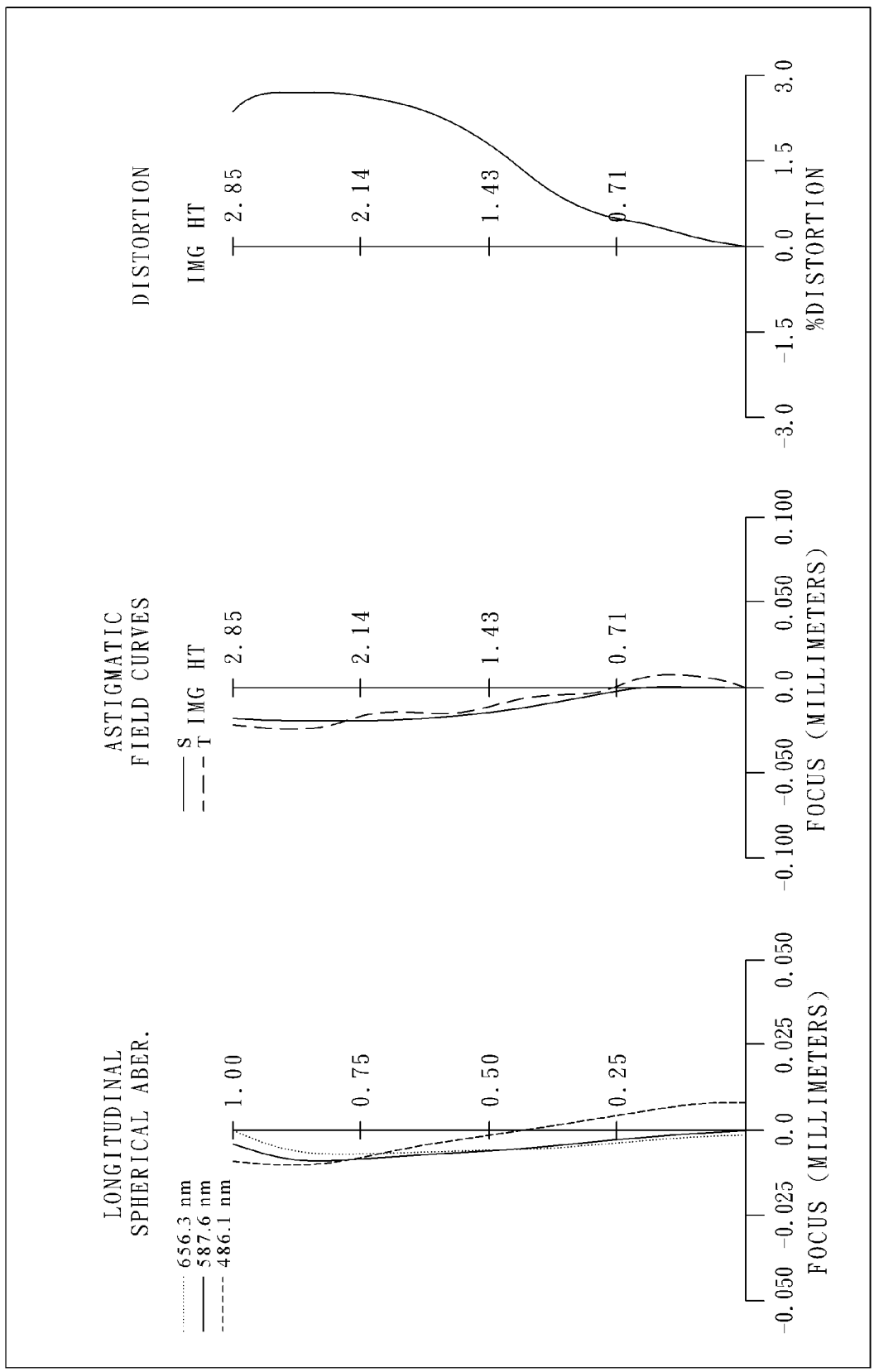
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging device according to the 8th embodiment.

In FIG. 8A, the imaging device includes the imaging lens assembly (not otherwise herein labeled) of the present disclosure and an image sensor 890. The imaging lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image plane 880, wherein the imaging lens assembly has a total of six lens elements (810-860) with refractive power.

The first lens element 810 with positive refractive power has a convex object-side surface 811 and a convex image-side surface 812, which are both aspheric, and the first lens element 810 is made of plastic material.

The second lens element 820 with negative refractive power has a concave object-side surface 821 and a concave image-side surface 822, which are both aspheric, and the second lens element 820 is made of plastic material.

The third lens element 830 with positive refractive power has a convex object-side surface 831 and a concave image-side surface 832, which are both aspheric, and the third lens element 830 is made of plastic material.

The fourth lens element 840 with positive refractive power has a concave object-side surface 841 and a convex image-side surface 842, which are both aspheric, and the fourth lens element 840 is made of plastic material.

The fifth lens element 850 with negative refractive power has a concave object-side surface 851 and a concave image-side surface 852, which are both aspheric, and the fifth lens element 850 is made of plastic material.

The sixth lens element 860 with negative refractive power has a convex object-side surface 861 in a paraxial region thereof and a concave image-side surface 862 in a paraxial region thereof, which are both aspheric, and the sixth lens element 860 is made of plastic material. Moreover, both of the object-side surface 861 and the image-side surface 862 of the sixth lens element 860 have at least one inflection point.

The IR-cut filter 870 is made of glass and located between the sixth lens element 860 and the image plane 880, and will not affect the focal length of the imaging lens assembly. The image sensor 890 is disposed on the image plane 880 of the imaging lens assembly.

The detailed optical data of the 8th embodiment are shown in Table 15 and the aspheric surface data are shown in Table 16 below.

TABLE 15

Embodiment 8
f = 3.46 mm, Fno = 2.30, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.049 | | | | |
| 2 | Lens 1 | 4.004 | ASP | 0.569 | Plastic | 1.544 | 55.9 | 3.00 |
| 3 | | −2.617 | ASP | 0.096 | | | | |
| 4 | Lens 2 | −19.410 | ASP | 0.265 | Plastic | 1.634 | 23.8 | −4.50 |
| 5 | | 3.363 | ASP | 0.379 | | | | |
| 6 | Lens 3 | 5.527 | ASP | 0.485 | Plastic | 1.544 | 55.9 | 29.73 |
| 7 | | 8.136 | ASP | 0.489 | | | | |
| 8 | Lens 4 | −4.586 | ASP | 0.727 | Plastic | 1.544 | 55.9 | 1.96 |
| 9 | | −0.914 | ASP | 0.120 | | | | |
| 10 | Lens 5 | −47.281 | ASP | 0.280 | Plastic | 1.640 | 23.3 | −7.88 |
| 11 | | 5.655 | ASP | 0.100 | | | | |
| 12 | Lens 6 | 1.656 | ASP | 0.280 | Plastic | 1.544 | 55.9 | −2.77 |
| 13 | | 0.742 | ASP | 0.750 | | | | |
| 14 | IR-cut filter | Plano | | 0.210 | Glass | 1.517 | 64.2 | — |
| 15 | | Plano | | 0.313 | | | | |
| 16 | Image | Plano | | — | | | | |

Note:
Reference wavelength is 587.6 nm (d-line).

| | | | Aspheric Coefficients | | | |
|---|---|---|---|---|---|---|
| Surface # | 2 | 3 | 4 | 5 | 6 | 7 |
| k = | −1.0984E+01 | −1.1901E+01 | −2.0000E+01 | −3.1086E+01 | −1.7247E+01 | −8.2791E+00 |
| A4 = | −3.8429E−02 | −7.5363E−02 | 1.8385E−02 | 3.0579E−02 | −1.0415E−01 | −7.6144E−02 |
| A6 = | −5.4201E−02 | −8.0226E−02 | −2.7817E−02 | −3.8022E−03 | 9.7417E−03 | −1.8714E−02 |
| A8 = | −2.1477E−02 | 3.5584E−02 | 2.1270E−02 | 7.2656E−03 | 2.1687E−02 | 8.5844E−03 |
| A10 = | −8.0445E−03 | −1.1711E−02 | −2.1348E−02 | −2.2604E−02 | −1.5092E−02 | −3.8230E−03 |
| A12 = | −1.7397E−02 | −1.9402E−02 | 2.1260E−02 | 1.6746E−02 | 4.3605E−03 | 4.6664E−05 |
| A14 = | −1.3204E−02 | 2.7715E−03 | −6.7191E−03 | −3.4339E−03 | | |
| Surface # | 8 | 9 | 10 | 11 | 12 | 13 |
| k = | −7.7100E+00 | −3.3035E+00 | −2.0000E+01 | 1.2658E+00 | −1.0000E+00 | −3.1045E+00 |
| A4 = | 4.9691E−03 | −3.8915E−02 | 2.2150E−02 | −1.9673E−02 | −1.3795E−01 | −6.1241E−02 |
| A6 = | −6.5440E−03 | 9.2719E−03 | −1.1249E−02 | 1.3919E−02 | 1.5666E−02 | 1.0719E−02 |
| A8 = | −2.0837E−02 | −1.0185E−03 | 2.5391E−06 | −1.1168E−02 | 1.2849E−03 | −1.0586E−03 |
| A10 = | 1.4157E−02 | −3.4991E−04 | −2.3472E−04 | 3.1884E−03 | −2.8510E−04 | 4.6111E−05 |
| A12 = | −4.6125E−03 | 3.5452E−04 | 3.7683E−05 | −4.4142E−04 | −9.6234E−06 | 2.0002E−06 |
| A14 = | 4.9493E−04 | | | 2.6692E−05 | 2.6615E−06 | −4.2111E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.46 | (R9 − R10)/(R9 + R10) | 1.27 |
| Fno | 2.30 | f/R11 | 2.09 |
| HFOV [deg.] | 38.8 | f/R2 | −1.32 |
| V4/V5 | 2.40 | f4/f3 | 0.07 |
| (V4 + V6)/V5 | 4.80 | f/f6 | −1.25 |
| CT5/CT3 | 0.58 | ImgH/Fno [mm] | 1.24 |
| (R5 − R6)/(R5 + R6) | −0.19 | | |

9th Embodiment

Figure 9A:
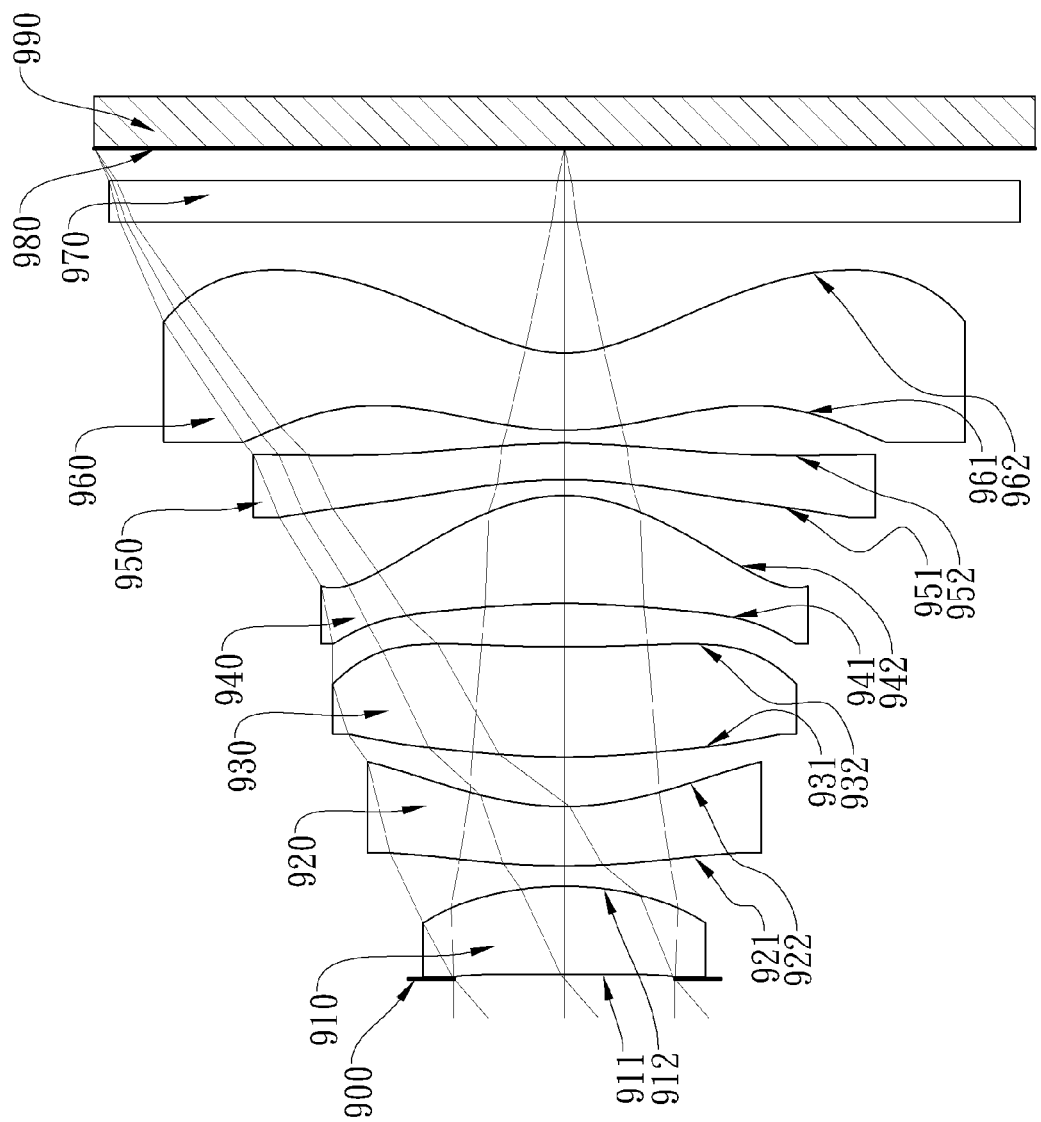
FIG. 9A is a schematic view of an imaging device according to the 9th embodiment of the present disclosure.
Figure 9B:
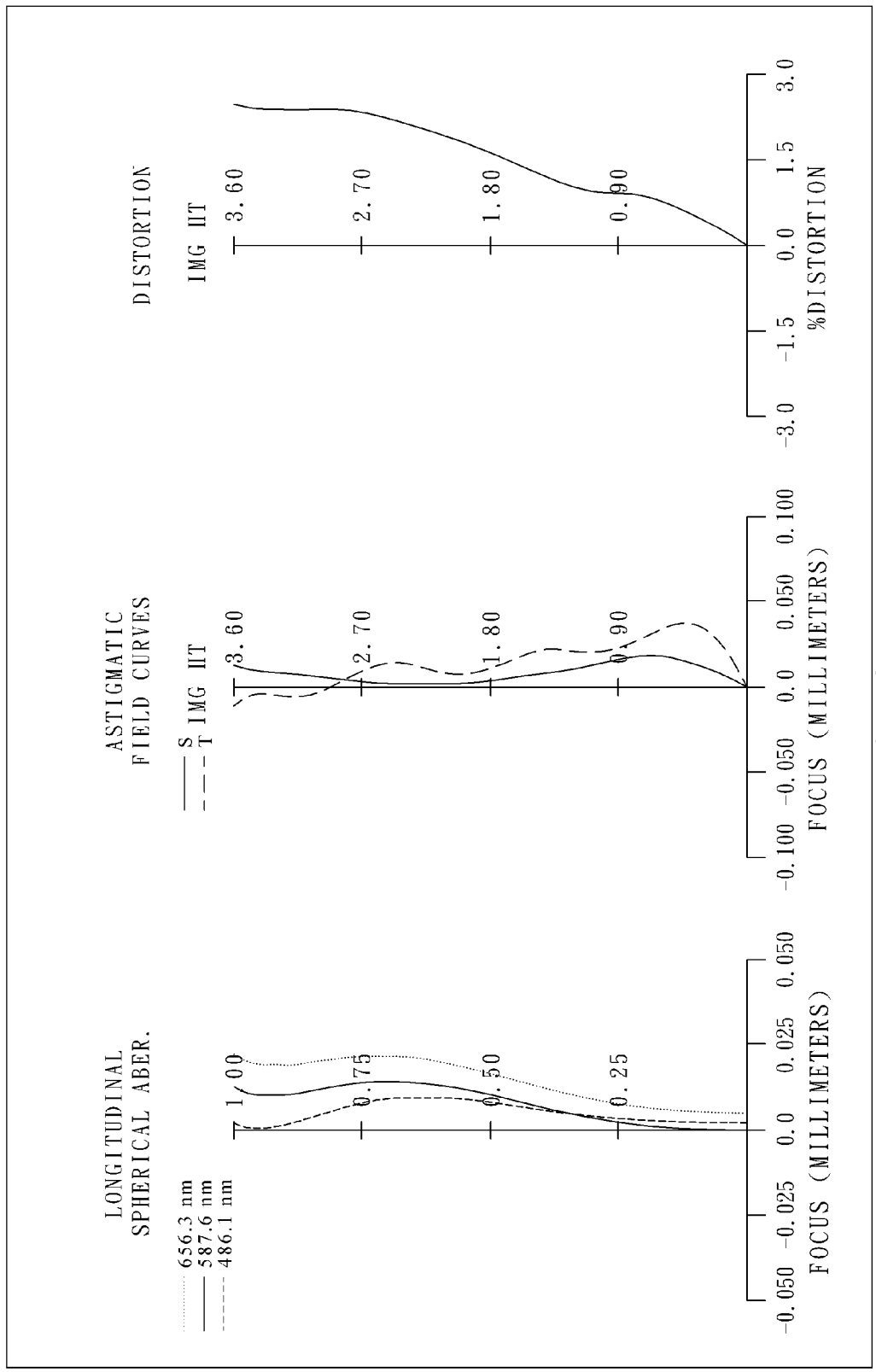
FIG. 9B shows spherical aberration curves, astigmatic field curves and a distortion curve of the imaging device according to the 9th embodiment.

FIG. 9A is a schematic view of an imaging device according to the 9th embodiment of the present disclosure. FIG. 9B shows, in order from left to right, spherical aberration curves, astigmatic field curves and a distortion curve of the imaging device according to the 9th embodiment.

In FIG. 9A, the imaging device includes the imaging lens assembly (not otherwise herein labeled) of the present disclosure and an image sensor 990. The imaging lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image plane 980, wherein the imaging lens assembly has a total of six lens elements (910-960) with refractive power.

The first lens element 910 with positive refractive power has a convex object-side surface 911 and a convex image-side surface 912, which are both aspheric, and the first lens element 910 is made of glass material.

The second lens element 920 with negative refractive power has a convex object-side surface 921 and a concave image-side surface 922, which are both aspheric, and the second lens element 920 is made of plastic material.

The third lens element 930 with positive refractive power has a convex object-side surface 931 and a concave image-side surface 932, which are both aspheric, and the third lens element 930 is made of plastic material.

The fourth lens element 940 with positive refractive power has a concave object-side surface 941 and a convex image-side surface 942, which are both aspheric, and the fourth lens element 940 is made of plastic material.

The fifth lens element 950 with negative refractive power has a concave object-side surface 951 and a convex image-side surface 952, which are both aspheric, and the fifth lens element 950 is made of plastic material.

The sixth lens element 960 with negative refractive power has a convex object-side surface 961 in a paraxial region thereof and a concave image-side surface 962 in a paraxial region thereof, which are both aspheric, and the sixth lens element 960 is made of plastic material. Moreover, both of the object-side surface 961 and the image-side surface 962 of the sixth lens element 960 have at least one inflection point.

The IR-cut filter 970 is made of glass and located between the sixth lens element 960 and the image plane 980, and will not affect the focal length of the imaging lens assembly. The image sensor 990 is disposed on the image plane 980 of the imaging lens assembly.

The detailed optical data of the 9th embodiment are shown in Table 17 and the aspheric surface data are shown in Table 18 below.

TABLE 17

Embodiment 9
f = 4.06 mm, Fno = 2.40, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.033 | | | | |
| 2 | Lens 1 | 29.658 | ASP | 0.676 | Glass | 1.548 | 45.7 | 4.09 |
| 3 | | −2.405 | ASP | 0.156 | | | | |
| 4 | Lens 2 | 5.590 | ASP | 0.455 | Plastic | 1.650 | 21.4 | −5.44 |
| 5 | | 2.096 | ASP | 0.379 | | | | |
| 6 | Lens 3 | 5.262 | ASP | 0.843 | Plastic | 1.530 | 55.8 | 18.17 |
| 7 | | 10.960 | ASP | 0.334 | | | | |
| 8 | Lens 4 | −5.738 | ASP | 0.828 | Plastic | 1.535 | 56.3 | 2.70 |
| 9 | | −1.211 | ASP | 0.120 | | | | |
| 10 | Lens 5 | −3.418 | ASP | 0.280 | Plastic | 1.639 | 23.5 | −19.56 |
| 11 | | −4.855 | ASP | 0.100 | | | | |
| 12 | Lens 6 | 2.421 | ASP | 0.590 | Plastic | 1.535 | 55.7 | −3.84 |
| 13 | | 1.017 | ASP | 1.000 | | | | |
| 14 | IR-cut filter | Plano | | 0.320 | Glass | 1.517 | 64.2 | — |
| 15 | | Plano | | 0.248 | | | | |
| 16 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | −2.0000E+01 | −8.7242E+00 | 1.3579E+00 | −7.9404E+00 | −1.4865E+01 | 2.7051E+00 |
| A4 = | −4.1162E−02 | −5.5141E−02 | −1.1588E−02 | 1.7304E−02 | −2.5842E−02 | −9.6997E−03 |
| A6 = | −1.8413E−02 | −1.5353E−02 | −1.2903E−02 | −1.0442E−02 | 2.7247E−03 | −1.3957E−02 |
| A8 = | 1.7887E−03 | 5.1800E−03 | 1.2563E−02 | 5.1732E−03 | 1.0219E−02 | 2.4823E−03 |
| A10 = | −6.4028E−03 | −8.5580E−04 | −1.1630E−02 | −4.6934E−03 | −4.6320E−03 | −1.1661E−03 |
| A12 = | 3.4221E−03 | −1.9741E−03 | 5.8546E−03 | 1.8873E−03 | 5.8586E−04 | 2.2387E−04 |
| A14 = | −2.8363E−03 | 6.7832E−04 | −1.0714E−03 | −2.6095E−04 | | |

| Surface # | 8 | 9 | 10 | 11 | 12 | 13 |
|---|---|---|---|---|---|---|
| k = | −9.8715E+00 | −2.3627E+00 | −1.2114E+01 | −9.5530E+01 | −1.0000E+00 | −3.4491E+00 |
| A4 = | 2.6086E−02 | 7.8269E−03 | 1.3984E−02 | −6.4613E−03 | −6.7095E−02 | −2.9856E−02 |
| A6 = | −2.3265E−03 | −3.4892E−03 | −1.0614E−03 | 1.1091E−02 | 4.7501E−03 | 4.0664E−03 |
| A8 = | −9.2844E−03 | 1.2542E−03 | −2.9724E−04 | −4.5094E−03 | 4.5567E−04 | −4.0280E−04 |
| A10 = | 4.0048E−03 | 2.8958E−04 | 6.6994E−06 | 9.3504E−04 | −8.2572E−05 | 2.1325E−05 |
| A12 = | −1.0049E−03 | −1.8065E−05 | 5.2044E−06 | −1.0195E−04 | −2.0728E−06 | −8.9169E−07 |
| A14 = | 1.2625E−04 | | | 4.6100E−06 | 7.5010E−07 | 1.7036E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.06 | (R9 − R10)/(R9 + R10) | −0.17 |
| Fno | 2.40 | f/R11 | 1.68 |
| HFOV [deg.] | 40.8 | f/R2 | −1.69 |
| V4/V5 | 2.40 | f4/f3 | 0.15 |
| (V4 + V6)/V5 | 4.77 | f/f6 | −1.06 |
| CT5/CT3 | 0.33 | ImgH/Fno [mm] | 1.50 |
| (R5 − R6)/(R5 + R6) | −0.35 | | |

10th Embodiment

Figure 10B:
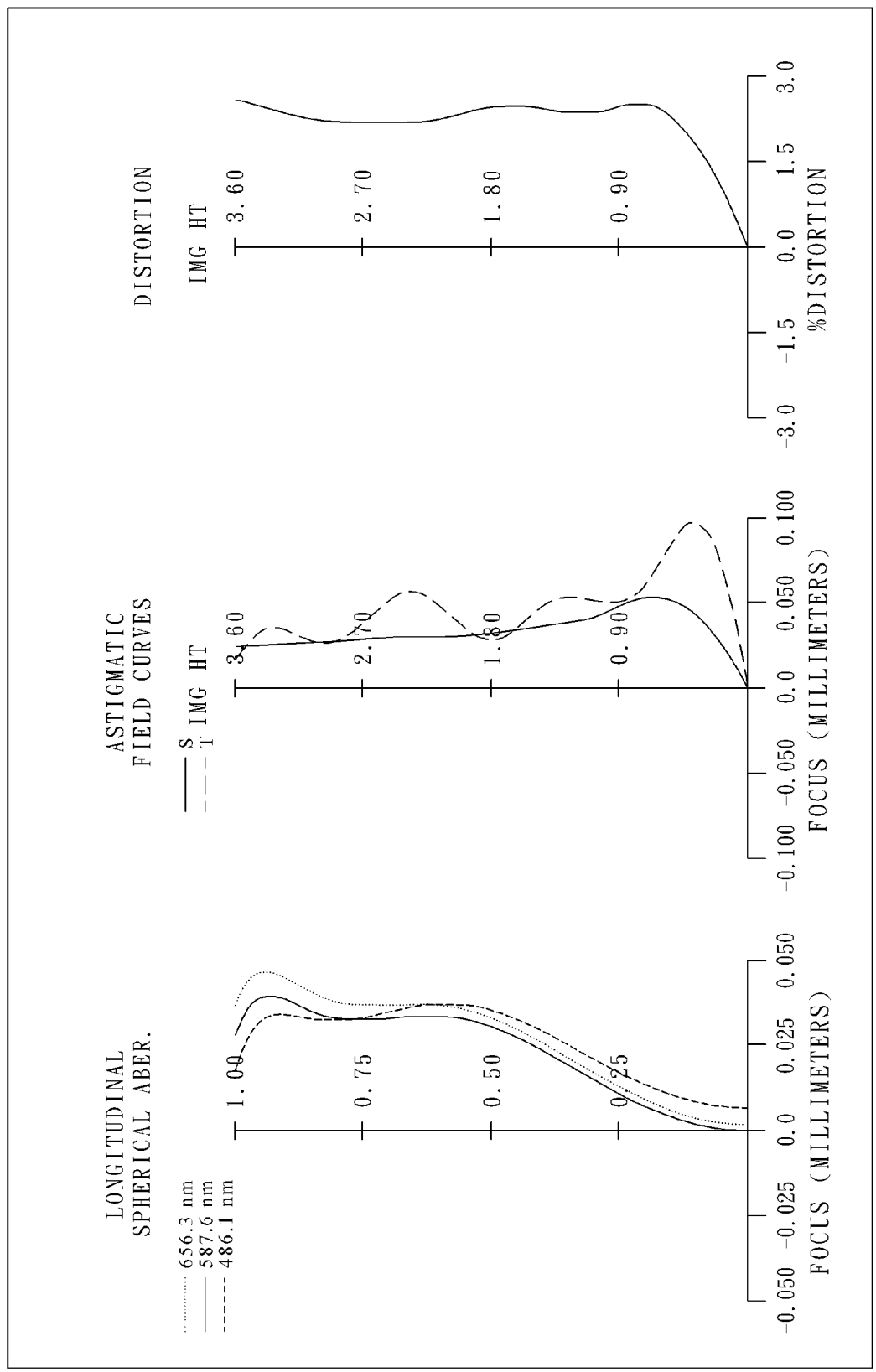
FIG. 10B shows spherical aberration curves, astigmatic field curves and a distortion curve of the imaging device according to the 10th embodiment.

FIG. 10A is a schematic view of an imaging device according to the 10th embodiment of the present disclosure. FIG. 10B shows, in order from left to right, spherical aberration curves, astigmatic field curves and a distortion curve of the imaging device according to the 10th embodiment.

In FIG. 10A, the imaging device includes the imaging lens assembly (not otherwise herein labeled) of the present disclosure and an image sensor 1090. The imaging lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1070 and an image plane 1080, wherein the imaging lens assembly has a total of six lens elements (1010-1060) with refractive power.

The first lens element 1010 with positive refractive power has a concave object-side surface 1011 and a convex image-side surface 1012, which are both aspheric, and the first lens element 1010 is made of plastic material.

The second lens element 1020 with negative refractive power has a convex object-side surface 1021 and a concave image-side surface 1022, which are both aspheric, and the second lens element 1020 is made of plastic material.

The third lens element 1030 with negative refractive power has a concave object-side surface 1031 and a concave image-side surface 1032, which are both aspheric, and the third lens element 1030 is made of plastic material.

The fourth lens element 1040 with positive refractive power has a convex object-side surface 1041 and a convex image-side surface 1042, which are both aspheric, and the fourth lens element 1040 is made of plastic material.

The fifth lens element 1050 with negative refractive power has a concave object-side surface 1051 and a convex image-side surface 1052, which are both aspheric, and the fifth lens element 1050 is made of plastic material.

The sixth lens element 1060 with negative refractive power has a convex object-side surface 1061 in a paraxial region thereof and a concave image-side surface 1062 in a paraxial region thereof, which are both aspheric, and the sixth lens element 1060 is made of plastic material. Moreover, both of the object-side surface 1061 and the image-side surface 1062 of the sixth lens element 1060 have at least one inflection point.

The IR-cut filter 1070 is made of glass and located between the sixth lens element 1060 and the image plane 1080, and will not affect the focal length of the imaging lens assembly. The image sensor 1090 is disposed on the image plane 1080 of the imaging lens assembly.

The detailed optical data of the 10th embodiment are shown in Table 19 and the aspheric surface data are shown in Table 20 below.

TABLE 19

Embodiment 10
f = 3.63 mm, Fno = 2.10, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.123 | | | | |
| 2 | Lens 1 | −57.637 | ASP | 0.777 | Plastic | 1.530 | 55.8 | 3.29 |
| 3 | | −1.702 | ASP | 0.100 | | | | |
| 4 | Lens 2 | 3.457 | ASP | 0.273 | Plastic | 1.650 | 21.4 | −6.48 |
| 5 | | 1.839 | ASP | 0.533 | | | | |
| 6 | Lens 3 | −10.020 | ASP | 0.600 | Plastic | 1.530 | 55.8 | −9.36 |
| 7 | | 10.034 | ASP | 0.271 | | | | |
| 8 | Lens 4 | 15.894 | ASP | 0.914 | Plastic | 1.530 | 55.8 | 2.58 |
| 9 | | −1.469 | ASP | 0.120 | | | | |
| 10 | Lens 5 | −2.360 | ASP | 0.350 | Plastic | 1.639 | 23.5 | −10.24 |
| 11 | | −3.906 | ASP | 0.100 | | | | |
| 12 | Lens 6 | 1.363 | ASP | 0.518 | Plastic | 1.535 | 55.7 | −9.59 |
| 13 | | 0.934 | ASP | 1.000 | | | | |
| 14 | IR-cut filter | Plano | | 0.320 | Glass | 1.517 | 64.2 | — |
| 15 | | Plano | | 0.218 | | | | |
| 16 | Image | Plano | | — | | | | |

Note:
Reference wavelength is 587.6 nm (d-line).

TABLE 20

Aspheric Coefficients

| Surface # | 2 | 3 | 4 | 5 | 6 | 7 |
|---|---|---|---|---|---|---|
| k = | −2.0000E+01 | −4.6527E+00 | −1.9765E+01 | −7.4571E+00 | 2.9861E+00 | −2.0000E+01 |
| A4 = | −6.8266E−02 | −1.0173E−01 | −2.1100E−02 | 8.4845E−03 | −2.5447E−02 | −3.4044E−02 |
| A6 = | −4.1041E−02 | −1.0998E−02 | −3.2657E−03 | −9.4073E−03 | 7.0844E−03 | −7.8072E−03 |
| A8 = | 7.1530E−03 | 1.2422E−02 | 1.3146E−03 | 7.0189E−03 | 1.1690E−02 | 3.2627E−03 |
| A10 = | −3.8933E−03 | −1.1494E−02 | −1.2842E−02 | −4.5206E−03 | −4.4677E−03 | −1.1558E−03 |
| A12 = | −4.3374E−02 | −3.2138E−03 | 5.7218E−03 | 1.6894E−03 | 4.7949E−04 | 2.7053E−04 |
| A14 = | 2.3079E−02 | 1.5164E−03 | −8.8417E−04 | −2.3893E−04 | | |

| Surface # | 8 | 9 | 10 | 11 | 12 | 13 |
|---|---|---|---|---|---|---|
| k = | −5.0792E+00 | −2.0592E+00 | −1.4462E+01 | −9.5530E+01 | −1.0000E+00 | −1.9442E+00 |
| A4 = | 1.1994E−02 | 2.5636E−02 | 1.1672E−02 | −1.3041E−03 | −8.7064E−02 | −4.6232E−02 |
| A6 = | −3.8728E−03 | −5.3218E−03 | −5.4624E−04 | 9.0596E−03 | 4.7625E−03 | 6.4473E−03 |
| A8 = | −7.9953E−03 | 7.8239E−05 | −7.6832E−05 | −4.4066E−03 | 5.8995E−04 | −4.9717E−04 |
| A10 = | 4.2012E−03 | 1.2443E−04 | 1.0677E−05 | 9.5925E−04 | −6.4917E−05 | 1.7588E−05 |
| A12 = | −1.0207E−03 | 2.1946E−05 | −1.5955E−06 | −1.0114E−04 | −2.1600E−06 | −2.0467E−07 |
| A14 = | 1.0469E−04 | | | 4.1642E−06 | 3.1951E−07 | −4.9869E−09 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.63 | (R9 − R10)/(R9 + R10) | −0.25 |
| Fno | 2.10 | f/R11 | 2.67 |
| HFOV [deg.] | 43.9 | f/R2 | −2.14 |
| V4/V5 | 2.37 | f4/f3 | −0.28 |
| (V4 + V6)/V5 | 4.74 | f/f6 | −0.38 |
| CT5/CT3 | 0.58 | ImgH/Fno [mm] | 1.71 |
| (R5 − R6)/(R5 + R6) | −1402.33 | | |

11th Embodiment

Figure 11A:
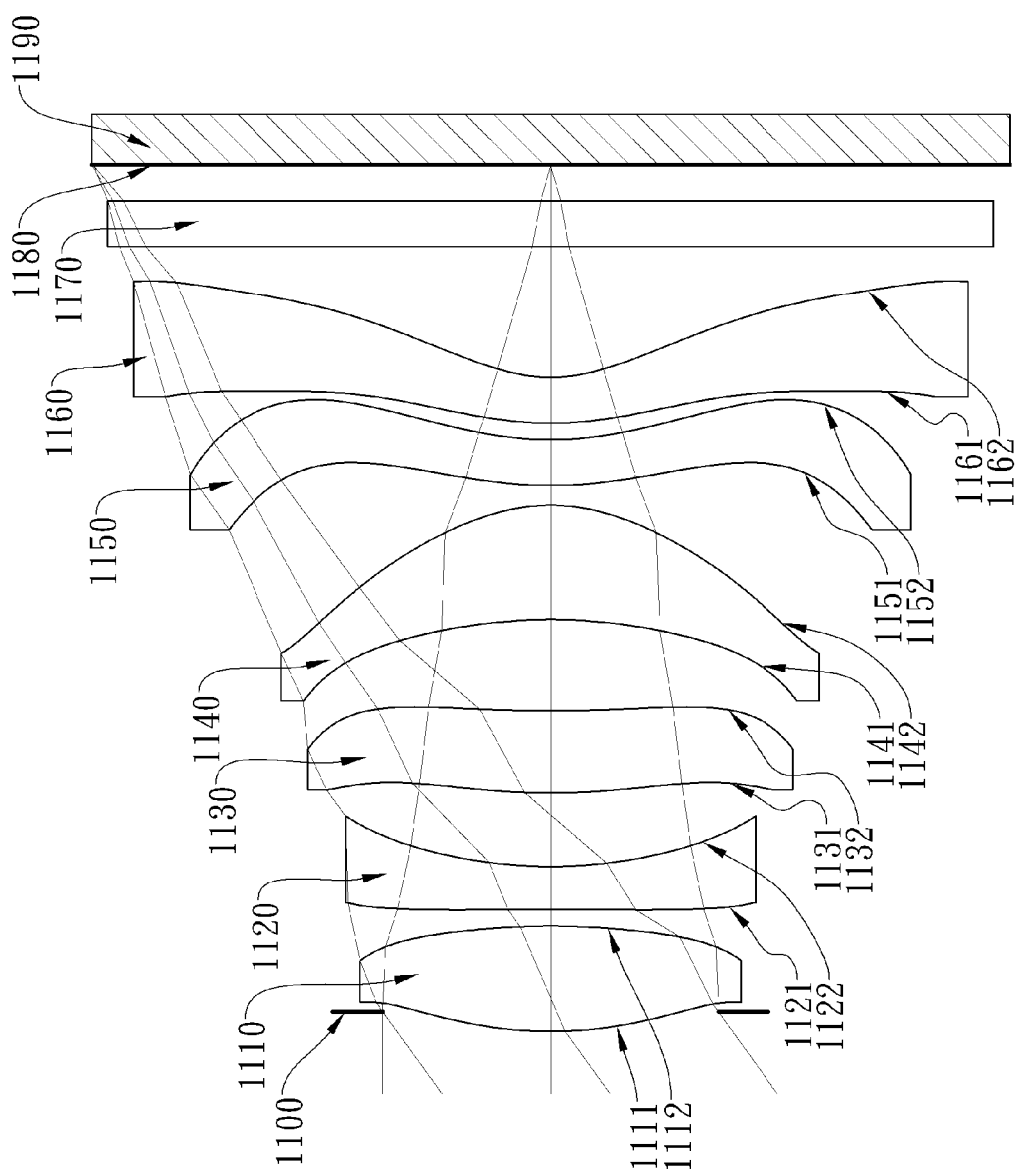
FIG. 11A is a schematic view of an imaging device according to the 11th embodiment of the present disclosure.
Figure 11B:
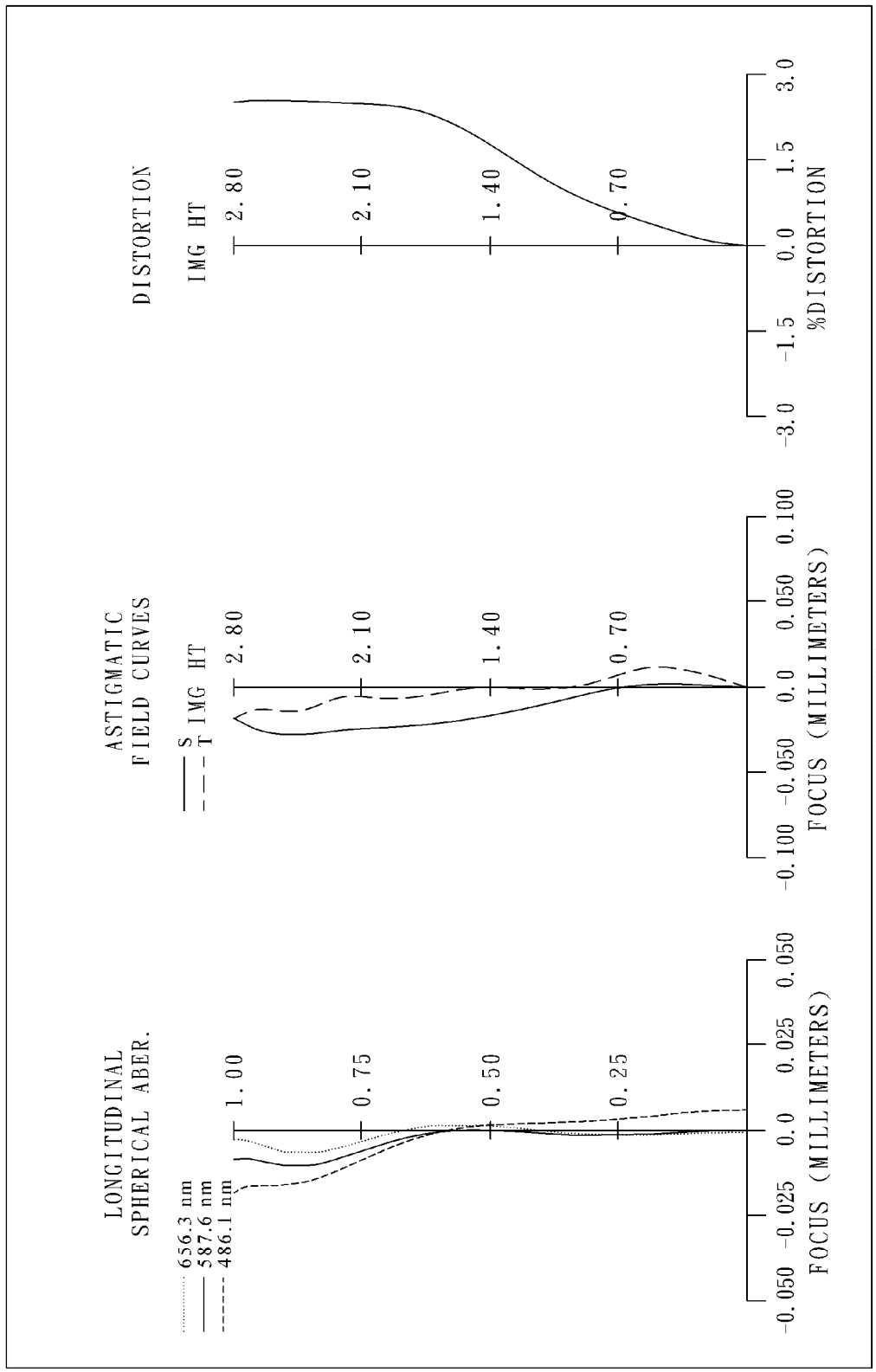
FIG. 11B shows spherical aberration curves, astigmatic field curves and a distortion curve of the imaging device according to the 11th embodiment.

FIG. 11A is a schematic view of an imaging device according to the 11th embodiment of the present disclosure. FIG. 11B shows, in order from left to right, spherical aberration curves, astigmatic field curves and a distortion curve of the imaging device according to the 11th embodiment.

In FIG. 11A, the imaging device includes the imaging lens assembly (not otherwise herein labeled) of the present disclosure and an image sensor 1190. The imaging lens assembly includes, in order from an object side to an image side, an aperture stop 1100, a first lens element 1110, a second lens element 1120, a third lens element 1130, a fourth lens element 1140, a fifth lens element 1150, a sixth lens element 1160, an IR-cut filter 1170 and an image plane 1180, wherein the imaging lens assembly has a total of six lens elements (1110-1160) with refractive power.

The first lens element 1110 with positive refractive power has a convex object-side surface 1111 and a convex image-side surface 1112, which are both aspheric, and the first lens element 1110 is made of plastic material.

The second lens element 1120 with negative refractive power has a concave object-side surface 1121 and a concave image-side surface 1122, which are both aspheric, and the second lens element 1120 is made of plastic material.

The third lens element 1130 with positive refractive power has a convex object-side surface 1131 and a concave image-side surface 1132, which are both aspheric, and the third lens element 1130 is made of plastic material.

The fourth lens element 1140 with positive refractive power has a concave object-side surface 1141 and a convex image-side surface 1142, which are both aspheric, and the fourth lens element 1140 is made of plastic material.

The fifth lens element 1150 with negative refractive power has a convex object-side surface 1151 and a concave image-side surface 1152, which are both aspheric, and the fifth lens element 1150 is made of plastic material.

The sixth lens element 1160 with negative refractive power has a convex object-side surface 1161 in a paraxial region thereof and a concave image-side surface 1162 in a paraxial region thereof, which are both aspheric, and the sixth lens element 1160 is made of plastic material. Moreover, both of the object-side surface 1161 and the image-side surface 1162 of the sixth lens element 1160 have at least one inflection point.

The IR-cut filter 1170 is made of glass and located between the sixth lens element 1160 and the image plane 1180, and will not affect the focal length of the imaging lens assembly. The image sensor 1190 is disposed on the image plane 1180 of the imaging lens assembly.

The detailed optical data of the 11th embodiment are shown in Table 21 and the aspheric surface data are shown in Table 22 below.

TABLE 21

Embodiment 11
f = 3.78 mm, Fno = 1.85, HFOV = 35.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 2.458 | ASP | 0.641 | Plastic | 1.544 | 55.9 | 2.99 |
| 3 | | −4.371 | ASP | 0.103 | | | | |
| 4 | Lens 2 | −22.507 | ASP | 0.265 | Plastic | 1.634 | 23.8 | −3.81 |
| 5 | | 2.716 | ASP | 0.449 | | | | |
| 6 | Lens 3 | 3.852 | ASP | 0.500 | Plastic | 1.544 | 55.9 | 12.49 |
| 7 | | 8.483 | ASP | 0.555 | | | | |
| 8 | Lens 4 | −3.101 | ASP | 0.697 | Plastic | 1.535 | 55.7 | 2.95 |
| 9 | | −1.127 | ASP | 0.120 | | | | |
| 10 | Lens 5 | 2.387 | ASP | 0.280 | Plastic | 1.607 | 26.6 | −31.17 |
| 11 | | 2.025 | ASP | 0.100 | | | | |
| 12 | Lens 6 | 2.122 | ASP | 0.280 | Plastic | 1.544 | 55.9 | −3.40 |
| 13 | | 0.942 | ASP | 0.800 | | | | |
| 14 | IR-cut filter | Plano | | 0.280 | Glass | 1.517 | 64.2 | — |
| 15 | | Plano | | 0.219 | | | | |
| 16 | Image | Plano | | — | | | | |

Note:
Reference wavelength is 587.6 nm (d-line).

TABLE 22

Aspheric Coefficients

| Surface # | 2 | 3 | 4 | 5 | 6 | 7 |
|---|---|---|---|---|---|---|
| k = | −5.7264E−01 | −2.0000E+01 | −2.0000E+01 | −1.3379E+01 | 2.1967E+00 | 3.0000E+00 |
| A4 = | −1.1516E−02 | 2.3769E−02 | 4.0751E−02 | 3.5043E−02 | −6.5687E−02 | −2.0711E−02 |
| A6 = | −1.6148E−02 | −6.2081E−02 | −1.7448E−02 | 4.9740E−03 | −1.5092E−02 | −2.5976E−02 |
| A8 = | 3.9742E−04 | 1.9338E−02 | 1.4838E−02 | 1.2545E−02 | 1.7176E−02 | 7.5398E−03 |
| A10 = | −1.2864E−02 | −1.2543E−02 | −2.3645E−02 | −2.3740E−02 | −1.5055E−02 | −3.5202E−03 |
| A12 = | 6.1911E−03 | 4.7029E−03 | 1.9616E−02 | 1.5811E−02 | 4.8742E−03 | 6.2696E−05 |
| A14 = | −4.4756E−03 | −1.9432E−03 | −4.8060E−03 | −3.4066E−03 | | |

| Surface # | 8 | 9 | 10 | 11 | 12 | 13 |
|---|---|---|---|---|---|---|
| k = | −1.3766E+01 | −2.8151E+00 | −1.4362E+01 | −4.0159E+00 | −1.0000E+00 | −3.8487E+00 |
| A4 = | −1.8028E−02 | −2.7756E−02 | −1.2626E−02 | −4.0923E−02 | −9.9511E−02 | −5.2585E−02 |
| A6 = | 4.3557E−03 | −1.9219E−03 | −1.0850E−02 | 1.4814E−02 | 1.4294E−02 | 1.0067E−02 |
| A8 = | −2.0298E−02 | −1.3036E−03 | 6.9276E−04 | −1.0949E−02 | 8.7548E−04 | −5.6669E−04 |
| A10 = | 1.3296E−02 | −3.0543E−05 | −9.2504E−05 | 3.2748E−03 | −3.0421E−04 | 2.5118E−06 |
| A12 = | −4.7249E−03 | 4.0973E−04 | 2.3287E−05 | −4.4348E−04 | −8.1816E−06 | −7.2109E−06 |
| A14 = | 5.5041E−04 | | | 2.1094E−05 | 2.9742E−06 | 7.2296E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.78 | (R9 − R10)/(R9 + R10) | 0.08 |
| Fno | 1.85 | f/R11 | 1.78 |
| HFOV [deg.] | 35.9 | f/R2 | −0.86 |
| V4/V5 | 2.09 | f4/f3 | 0.24 |
| (V4 + V6)/V5 | 4.20 | f/f6 | −1.11 |
| CT5/CT3 | 0.56 | ImgH/Fno [mm] | 1.51 |
| (R5 − R6)/(R5 + R6) | −0.38 | | |

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
    a first lens element with positive refractive power having a convex image-side surface;
    a second lens element having refractive power;
    a third lens element having refractive power;
    a fourth lens element having refractive power;
    a fifth lens element having negative refractive power; and
    a sixth lens element with negative refractive power having a concave image-side surface in a paraxial region thereof, wherein an object-side surface and the image-side surface of the sixth lens element are aspheric, and at least one of the object-side surface and the image-side surface of the sixth lens element has at least one inflection point;
    wherein the imaging lens assembly has a total of six lens elements with refractive power, a focal length of the imaging lens assembly is f, a curvature radius of the image-side surface of the first lens element is R2, a focal length of the sixth lens element is f6, and the following conditions are satisfied:

$-5.0 < f/R2 < -0.7$; and $-2.0 < f/f6 < -0.90$.

2. The imaging lens assembly of claim 1, wherein the second lens element has negative refractive power.

3. The imaging lens assembly of claim 2, wherein the fourth lens element has positive refractive power.

4. The imaging lens assembly of claim 3, wherein the second lens element has a concave image-side surface, and the fourth lens element has a convex image-side surface.

5. The imaging lens assembly of claim 4, wherein the first lens element has a convex object-side surface.

6. The imaging lens assembly of claim 4, wherein the second lens element has a convex object-side surface.

7. The imaging lens assembly of claim 4, wherein the sixth lens element has the object-side surface being convex in a paraxial region thereof, the focal length of the imaging lens assembly is f, a curvature radius of the object-side surface of the sixth lens element is R11, and the following condition is satisfied:

$0.5 < f/R11 < 3.0$.

8. The imaging lens assembly of claim 4, wherein a curvature radius of the object-side surface of the fifth lens element is R9, a curvature radius of the image-side surface of the fifth lens element is R10, and the following condition is satisfied:

$-0.4 < (R9-R10)/(R9+R10) < 0$.

9. The imaging lens assembly of claim 4, wherein the focal length of the imaging lens assembly is f, the focal length of the sixth lens element is f6, and the following condition is satisfied:

$-1.8 < f/f6 < -1.0$.

10. The imaging lens assembly of claim 1, wherein the fifth lens element has a concave object-side surface.

11. The imaging lens assembly of claim 1, wherein an Abbe number of the fourth lens element is V4, an Abbe number of the fifth lens element is V5, and the following condition is satisfied:

$1.5 < V4/V5 < 4.0$.

12. The imaging lens assembly of claim 1, wherein a central thickness of the fifth lens element is CT5, a central thickness of the third lens element is CT3, and the following condition is satisfied:

$0.20 < CT5/CT3 < 0.60$.

13. The imaging lens assembly of claim 1, wherein an Abbe number of the fourth lens element is V4, an Abbe number of the sixth lens element is V6, an Abbe number of the fifth lens element is V5, and the following condition is satisfied:

$4.0 < (V4+V6)/V5 < 6.5$.

14. An imaging device, comprising:
    the imaging lens assembly of claim 1; and
    an image sensor, wherein the image sensor is located on an image plane of the imaging lens assembly.

15. A mobile terminal, comprising:
    the imaging device of claim 14.

16. An imaging lens assembly comprising, in order from an object side to an image side:
    a first lens element with positive refractive power having a convex image-side surface;
    a second lens element having refractive power;
    a third lens element having refractive power;
    a fourth lens element having refractive power;
    a fifth lens element with negative refractive power having a concave object-side surface; and
    a sixth lens element with refractive power having a concave image-side surface in a paraxial region thereof, wherein an object-side surface and the image-side surface of the sixth lens element are aspheric, and at least one of the object-side surface and the image-side surface of the sixth lens element has at least one inflection point;

wherein the imaging lens assembly has a total of six lens elements with refractive power, a focal length of the imaging lens assembly is f, a curvature radius of the image-side surface of the first lens element is R2, a focal length of the fourth lens element is f4, a focal length of the third lens element is f3, and the following conditions are satisfied:

$-5.0 < f/R2 < -0.7$; and $-0.40 < f4/f3 < 0.40$.

17. The imaging lens assembly of claim 16, wherein the second lens element has negative refractive power, the fourth lens element has positive refractive power, and the sixth lens element has negative refractive power.

18. The imaging lens assembly of claim 16, wherein the first lens element has a convex object-side surface, the fourth lens element has a convex image-side surface, and the fifth lens element has a convex image-side surface.

19. The imaging lens assembly of claim 16, wherein an Abbe number of the fourth lens element is V4, an Abbe number of the fifth lens element is V5, and the following condition is satisfied:

$1.5 < V4/V5 < 4.0$.

20. The imaging lens assembly of claim 16, wherein a curvature radius of an object-side surface of the third lens element is R5, a curvature radius of the image-side surface of the third lens element is R6, and the following condition is satisfied:

$-0.65 < (R5-R6)/(R5+R6) < 0.20$.

21. The imaging lens assembly of claim 16, wherein a maximum image height of the imaging lens assembly is ImgH, an f-number of the imaging lens assembly is Fno, and the following condition is satisfied:

$1.3 \text{ mm} < \text{ImgH/Fno} < 4.0 \text{ mm}$.

22. An imaging lens assembly comprising, in order from an object side to an image side:
   a first lens element with positive refractive power having a convex image-side surface;
   a second lens element having refractive power;
   a third lens element having refractive power;
   a fourth lens element having refractive power;
   a fifth lens element with negative refractive power having a concave object-side surface; and
   a sixth lens element with refractive power having a concave image-side surface in a paraxial region thereof, wherein an object-side surface and the image-side surface of the sixth lens element are aspheric, and at least one of the object-side surface and the image-side surface of the sixth lens element has at least one inflection point;
   wherein the imaging lens assembly has a total of six lens elements with refractive power, a focal length of the imaging lens assembly is f, a curvature radius of the image-side surface of the first lens element is R2, an Abbe number of the fourth lens element is V4, an Abbe number of the fifth lens element is V5, and the following conditions are satisfied:

$-5.0 < f/R2 < -0.7$; and $1.5 < V4/V5 < 4.0$.

23. The imaging lens assembly of claim 22, wherein the second lens element has negative refractive power and a concave image-side surface, and the fourth lens element has positive refractive power.

24. The imaging lens assembly of claim 22, wherein half of a maximal field of view of the imaging lens assembly is HFOV, and the following condition is satisfied:

38 degrees < HFOV.

25. The imaging lens assembly of claim 22, wherein the object-side surface of the first lens element has at least one inflection point.

26. The imaging lens assembly of claim 22, wherein the focal length of the imaging lens assembly is f, the curvature radius of the image-side surface of the first lens element is R2, and the following condition is satisfied:

$-3.0 < f/R2 < -0.7$.

27. The imaging lens assembly of claim 22, wherein the Abbe number of the fourth lens element is V4, an Abbe number of the sixth lens element is V6, the Abbe number of the fifth lens element is V5, and the following condition is satisfied:

$4.0 < (V4+V6)/V5 < 6.5$.

28. The imaging lens assembly of claim 22, wherein a curvature radius of the object-side surface of the fifth lens element is R9, a curvature radius of the image-side surface of the fifth lens element is R10, and the following condition is satisfied:

$-0.3 < (R9-R10)/(R9+R10) < 0$.

* * * * *